United States Patent
Tanimura et al.

(10) Patent No.: US 10,854,887 B2
(45) Date of Patent: Dec. 1, 2020

(54) CARBON SHEET, GAS DIFFUSION ELECTRODE SUBSTRATE AND FUEL CELL

(71) Applicant: Toray Industries, Inc., Tokyo (JP)

(72) Inventors: Yasuaki Tanimura, Otsu (JP); Takashi Chida, Otsu (JP); Toru Sugahara, Otsu (JP); Masamichi Utsunomiya, Otsu (JP); Toshiya Kamae, Otsu (JP); Katsuya Sode, Otsu (JP); Takashi Ando, Otsu (JP)

(73) Assignee: Toray Industries, Inc., Tokyo (JP)

( * ) Notice: Subject to any disclaimer, the term of this patent is extended or adjusted under 35 U.S.C. 154(b) by 77 days.

(21) Appl. No.: 15/518,879

(22) PCT Filed: Oct. 7, 2015

(86) PCT No.: PCT/JP2015/078492
§ 371 (c)(1),
(2) Date: Apr. 13, 2017

(87) PCT Pub. No.: WO2016/060043
PCT Pub. Date: Apr. 21, 2016

(65) Prior Publication Data
US 2017/0237079 A1    Aug. 17, 2017

(30) Foreign Application Priority Data

Oct. 17, 2014  (JP) .................................. 2014-212424
Oct. 17, 2014  (JP) .................................. 2014-212518
Oct. 17, 2014  (JP) .................................. 2014-212519

(51) Int. Cl.
*H01M 4/96*        (2006.01)
*H01M 8/0234*     (2016.01)
(Continued)

(52) U.S. Cl.
CPC .......... *H01M 4/96* (2013.01); *H01M 4/8605* (2013.01); *H01M 8/0234* (2013.01);
(Continued)

(58) Field of Classification Search
CPC .... H01M 4/96; H01M 8/0234; H01M 8/0241; H01M 8/0239; H01M 4/8605; H01M 8/0245
See application file for complete search history.

(56) References Cited

U.S. PATENT DOCUMENTS 4,851,304 A      7/1989  Miwa et al.
2002/0134501 A1*  9/2002  Fan ..................... H01M 4/8807
                                                        156/308.2
(Continued)

FOREIGN PATENT DOCUMENTS

EP    1 612 313        1/2006
JP    63-254669 A     10/1988
(Continued)

OTHER PUBLICATIONS

Supplementary European Search Report dated Jun. 1, 2018, of corresponding European Application No. 15851244.2.

*Primary Examiner* — Barbara L Gilliam
*Assistant Examiner* — Kwang Han
(74) *Attorney, Agent, or Firm* — DLA Piper LLP (US)

(57) ABSTRACT

A porous carbon sheet includes a carbon fiber and a binding material, wherein when in a measured surface depth distribution, a ratio of an area of a portion having a depth of 20 μm or less in a measured area of one surface is a surface layer area ratio X, and a ratio of an area of a portion having a depth of 20 μm or less in a measured area of another surface is a surface layer area ratio Y, the surface layer area (Continued)

ratio X is larger than the surface layer area ratio Y, and a difference between the surface layer area ratios is 3% or more and 12% or less.

10 Claims, 3 Drawing Sheets

(51) Int. Cl.
  *H01M 8/0239* (2016.01)
  *H01M 8/0245* (2016.01)
  *H01M 8/0241* (2016.01)
  *H01M 4/86* (2006.01)
(52) U.S. Cl.
  CPC ....... *H01M 8/0239* (2013.01); *H01M 8/0241* (2013.01); *H01M 8/0245* (2013.01)

(56) References Cited

U.S. PATENT DOCUMENTS

| | | | |
|---|---|---|---|
| 2006/0046926 A1* | 3/2006 | Ji | H01M 4/8605 502/101 |
| 2006/0180798 A1* | 8/2006 | Chida | C04B 35/83 252/502 |
| 2011/0171563 A1* | 7/2011 | Waki | H01M 8/0234 429/514 |
| 2011/0244358 A1 | 10/2011 | Yamauchi et al. | |
| 2012/0153522 A1 | 6/2012 | Chida et al. | |
| 2012/0276335 A1* | 11/2012 | Hong | H01M 8/0234 428/143 |
| 2015/0372332 A1 | 12/2015 | Okano et al. | |
| 2016/0087283 A1 | 3/2016 | Sumioka | |

FOREIGN PATENT DOCUMENTS

| | | |
|---|---|---|
| JP | 2003-109604 A | 4/2003 |
| JP | 2010-102879 A | 5/2010 |
| JP | 2011-233537 A | 11/2011 |
| JP | 2013-145640 A | 7/2013 |
| WO | 2007/037084 A1 | 4/2007 |
| WO | 2014/126002 A1 | 8/2014 |
| WO | 2014/181771 A1 | 11/2014 |

* cited by examiner

CARBON SHEET, GAS DIFFUSION ELECTRODE SUBSTRATE AND FUEL CELL

TECHNICAL FIELD

This disclosure relates to a carbon sheet suitably used in a fuel cell, particularly in a polymer electrolyte fuel cell; a gas diffusion electrode substrate; and a fuel cell including the gas diffusion electrode substrate.

BACKGROUND

A polymer electrolyte fuel cell in which a hydrogen-containing fuel gas and oxygen-containing oxidizing gas are supplied to an anode and cathode, respectively, and an electromotive force is generated by an electrochemical reaction occurring at both poles is generally constituted of laminating a bipolar plate, a gas diffusion electrode substrate, a catalyst layer, an electrolyte membrane, a catalyst layer, a gas diffusion electrode substrate and a bipolar plate in this order. The gas diffusion electrode substrate is required to have high gas diffusivity to allow a gas supplied from the bipolar plate to be diffused into the catalyst layer and high water removal performance for discharging water generated by the electrochemical reaction to the bipolar plate, as well as high electrical conductivity for extracting generated electric current, and thus gas diffusive electrode substrates with a microporous layer formed on a surface of a carbon sheet as a substrate composed of a carbon fiber and so on, are widely used.

However, as a problem with the gas diffusion electrode substrate, the following problem is known: when the polymer electrolyte fuel cell is operated at a relatively low temperature of below 70° C. in a high current density region, as a result of blockage of the gas diffusion electrode substrate by liquid water generated in a large amount and shortage in the gas supply, the fuel cell performance is impaired (this problem may be hereinafter described as "flooding"). Thus, the gas diffusion electrode substrate is required to have higher water removal performance. Various efforts have been made to solve that problem.

For example, there have been proposed fuel cell gas diffusion electrode substrates having the following configurations to improve gas diffusivity and water removal performance: a plurality of layers including electrically conductive particles having different average particle sizes are laminated to control the porosity on both sides (see Japanese Patent Laid-open Publication No. 2011-233537); and carbon fibers having different fiber lengths are mixed to control the pore diameter on both sides (see Japanese Patent Laid-open Publication No. 2010-102879).

There has been proposed a method of preparing a gas diffusion electrode substrate in which the loading amount of a binding material is continuously decreased in a through-plane direction (see Japanese Patent Laid-open Publication No. 2013-145640).

However, in Japanese Patent Laid-open Publication No. 2011-233537 and Japanese Patent Laid-open Publication No. 2010-102879, the total thickness of a carbon sheet increases because a plurality of layers each having a controlled porosity and pore diameter are prepared and laminated. As a result, gas diffusivity and water removal performance are insufficient so that flooding cannot be sufficiently suppressed. Therefore, fuel cell performance is still insufficient.

In Japanese Patent Laid-open Publication No. 2013-145640, a resin composition serving as a binding material is applied to one surface and, therefore, deviation of the binding material increases so that the amount of the binding material becomes excessively large to maintain binding as a whole. As a result, gas diffusivity is rather deteriorated so that flooding cannot be sufficiently suppressed and, therefore, fuel cell performance is still insufficient.

It could therefore be helpful to provide a carbon sheet suitably used in a gas diffusion electrode substrate and having considerably improved gas diffusivity and water removal performance, and thus has an excellent anti-flooding characteristic, and capable of exhibiting high fuel cell performance even in operation at a relatively low temperature in a high current density region, and having excellent mechanical properties, electrical conductivity and thermal conductivity.

It could also be helpful to stably produce a thin carbon sheet having sufficient gas diffusivity and water removal performance and which has been difficult to prepare using a conventional method, and a gas diffusion electrode substrate.

It could be still further helpful to provide a gas diffusion electrode substrate obtained using the carbon sheet as a substrate, and a fuel cell including the gas diffusion electrode substrate.

SUMMARY

We thus provide:

A porous carbon sheet may include a carbon fiber and a binding material, wherein when in a measured surface depth distribution, the ratio of the area of a portion having a depth of 20 or less in the measured area of one surface is a surface layer area ratio X, and the ratio of the area of a portion having a depth of 20 μm or less in the measured area of the other surface is a surface layer area ratio Y, the surface layer area ratio X is larger than the surface layer area ratio Y, and a difference between the surface layer area ratios is 3% or more and 12% or less.

The surface layer area ratio X may be 13% or more and 17% or less, and the surface layer area ratio Y may be 9% or more and 13% or less.

The carbon sheet may have a surface having a surface layer area ratio X which is a surface X1, and a surface having the surface layer area ratio Y which is a surface Y1, the surface roughness of the surface X1 is smaller than the surface roughness of the surface Y1, and a difference between the surface roughnesses of the surfaces X1 and Y1 is 1 μm or more and 4 μm or less.

The carbon sheet may have a surface having a surface layer area ratio X which is a surface X1, the surface roughness of the surface X1 is 16 μm or less.

A porous carbon sheet may include a carbon fiber and a binding material, wherein when a surface having a larger covering rate on the surface by the carbon fiber and the binding material is a surface X2, and a surface having a smaller covering rate on the surface by the carbon fiber and the binding material is a surface Y2, a difference in the covering rate between the surface X2 and the surface Y2 is 5% or more and 20% or less.

The covering rate on the surface X2 may be 70% or more and 90% or less, and the covering rate on the surface Y2 may be 50% or more and 75% or less.

The carbon sheet may include a hydrophobic material, and where among layers obtained by dividing the carbon sheet in a through-plane direction thereof into three equal parts within a section extending from a surface having a 50% average fluorine intensity, which is closest to one surface, to a surface having a 50% average fluorine intensity, which is closest to the other surface, one of a layer close to one surface and a layer close to the other layer, which has a larger average fluorine intensity, is a layer A, the other one of a layer close to one surface and a layer close to the other layer, which has a smaller average fluorine intensity, is a layer B, and a layer between the layer A and the layer B is a layer C, the average fluorine intensity of the layer decreases in the order of the layer A, the layer B and the layer C.

The melting point of the hydrophobic material may be 200° C. or more and 320° C. or less.

The sliding angle of water at the surface Y1 or the surface Y2 may be 40 degrees or less.

The sum of volumes of pores having a diameter in the range of 1 to 100 μm is 100%, the sum of volumes of pores having a diameter in the range of 50 to 100 μm is 17 to 50%, and the porosity (($\rho_t - \rho_b$)/$\rho_t$) calculated from the bulk density ($\rho_b$) and the true density ($\rho_t$) may be 75 to 87%.

The diameter of a pore having the largest volume (peak diameter) in the diameter range of 1 to 100 μm may be within the range of 30 to 50 μm.

When the sum of volumes of pores having a pore diameter in the range of 1 to 100 μm is 100%, the sum of volumes of pores having a pore diameter in the range of 50 to 100 μm is 17 to 50%, and the porosity (($\rho_t - \rho_b$)/$\rho_t$) calculated from the bulk density ($\rho_b$) and the true density ($\rho_t$) may be 75 to 87%.

The diameter of a pore having the largest volume (peak diameter) in the diameter range of 1 to 100 μm may be within the range of 30 to 50 μm.

A relatively thin carbon sheet having an excellent anti-flooding characteristic, which has been heretofore difficult to prepare, can be obtained. The carbon sheet is capable of improving fuel cell performance particularly at a low temperature, and suitably used in a gas diffusion electrode substrate.

DESCRIPTION OF REFERENCE SIGNS

Figure 1:
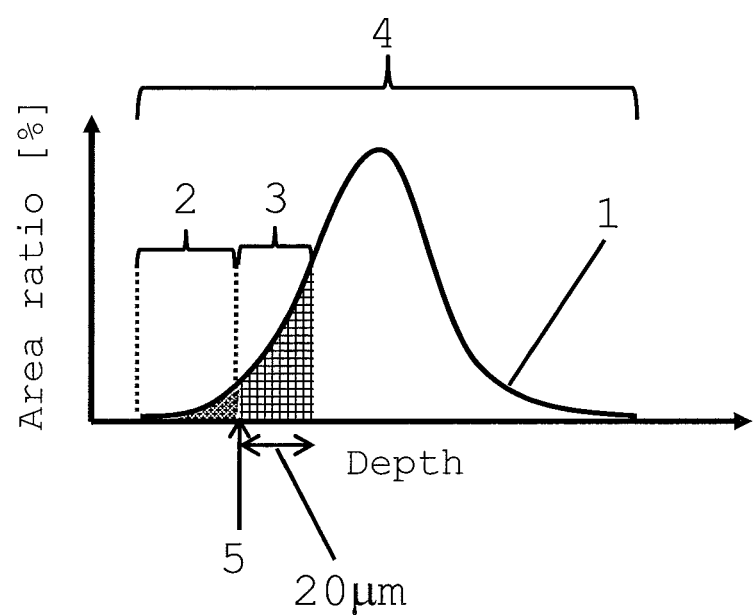
FIG. 1 is a schematic view of a profile of a depth versus a ratio of an area of a portion having the depth in measurement of a depth distribution.

1: Depth-versus-area ratio profile
2: Excluded area ratio
3: Surface layer area ratio
4: Total measured area ratio
5: Depth at which cumulative area ratio reaches 2%
6: Carbon sheet
7: Surface X1 or surface X2
8: Surface Y1 or surface Y2
9: Depth at which cumulative area ratio reaches 2% (reference depth)
10: Depth of part deeper than reference depth by 20 μm
11: Layer having average fluorine intensity less than 50% average fluorine intensity
12: Surface AA
13: Surface BB
14: Layer A
15: Layer C
16: Layer B
17: Section
18: Distribution of fluorine intensity
19: Average value of fluorine intensity
20: Value of 50% of average value of fluorine intensity

DETAILED DESCRIPTION

We provide a porous carbon sheet including a carbon fiber and a binding material, wherein when in a measured surface depth distribution, the ratio of the area of a portion having a depth of 20 μm or less in the measured area of one surface is a surface layer area ratio X, and the ratio of the area of a portion having a depth of 20 μm or less in the measured area of the other surface is a surface layer area ratio Y, the surface layer area ratio X is larger than the surface layer area ratio Y, and a difference between the surface layer area ratios is 3% to 12%.

The "area of a portion having a depth of 20 μm or less in the measured area of a surface" is obtained in the following manner: a surface depth distribution is measured, the areas of portions having a depth from the outermost surface to a part close to the outermost surface side (shallow portions close to the outermost surface side) are cumulatively added, a depth at which the ratio of the cumulative area in the whole measured range reaches 2% is determined, and with the depth as a reference, a sum of the areas of portions in a range from the reference to a depth of 20 μm is determined. The area thus determined is defined as the "area of a portion having a depth of 20 μm or less in the measured area of a surface". The ratio of the "area of a portion having a depth of 20 μm or less" in the measured area is defined as a surface layer area ratio.

Accordingly, the surface layer area ratio is an area ratio obtained in the following manner: a surface depth distribution is measured, the area ratios of portions having a depth from the outermost surface to a part close to the outermost surface side (shallow portions close to the outermost surface side) are cumulatively added, a depth at which the ratio of the cumulative area in the whole measured range reaches 2% is determined, and with the depth as a reference, the area ratios of portions in a range from the reference to a depth of 20 μm are cumulatively added. The surface layer area ratio on one surface is different from the surface layer area ratio on the other surface.

FIG. 1 is a schematic view of a profile of a depth versus a ratio of an area (area ratio) of a portion having the depth in measurement of a depth distribution. A depth-versus-area ratio profile (1) represents a ratio of an area (area ratio) of a portion having the depth in the whole measured range, and a total measured area ratio (4) represents a total of area ratios in all depth regions in the measured range, and is equal to 100%. Area ratios of shallow portions close to the outermost surface are cumulatively added, and the area ratio of a portion at which the cumulative area ratio reaches 2% is defined as an excluded area ratio (2). The rightmost point (depth) included in the excluded area ratio (2) is defined as a depth (5) at which the cumulative area ratio reaches 2%, and with this point as a reference (0 μm) of the depth, the area ratios of portions are situated in a range from the reference (0 μm) to a depth of 20 μm in a through-plane direction. The cumulative area ratio thus obtained is defined as a surface layer area ratio (3).

We also provide a porous carbon sheet including a carbon fiber and a binding material, wherein when a surface having a larger covering rate on the surface by the carbon fiber and the binding material is a surface X2, and a surface having a smaller covering rate on the surface by the carbon fiber and the binding material is a surface Y2, a difference in the covering rate between the surface X2 and the surface Y2 is 5% or more and 20% or less.

Preferably, the carbon sheet includes a hydrophobic material, and where among layers obtained by dividing the carbon sheet in a through-plane direction thereof into three equal parts within a section extending from a surface having a 50% average fluorine intensity, which is closest to one surface, to a surface having a 50% average fluorine intensity, which is closest to the other surface, one of a layer close to one surface and a layer close to the other layer, which has a larger average fluorine intensity, is a layer A, the other one of a layer close to one surface and a layer close to the other layer, which has a smaller average fluorine intensity, is a layer B, and a layer between the layer A and the layer B is a layer C, the average fluorine intensity of the layer decreases in the order of the layer A, the layer B and the layer C.

The 50% average fluorine intensity is a value of 50% of the average of fluorine intensities measured along a straight line extending in a through-plane direction of the carbon sheet from one surface to the other surface of the carbon sheet. The "surface having a 50% average fluorine intensity, which is closest to one surface" represents a virtual surface that is substantially parallel to a surface of the carbon sheet and that includes a set of points showing a 50% average fluorine intensity, which are closest to one surface on a straight line in a through-plane direction of the carbon sheet in the measurement. The "surface having a 50% average fluorine intensity, which is closest to one surface" is not required to be actually a continuous surface in the carbon sheet. The phrase "the average fluorine intensity of the layer decreases in the order of the layer A, the layer B and the layer C" means that the layers satisfy the relationship of layer A>layer B>layer C in terms of the average fluorine intensity.

Figure 2:
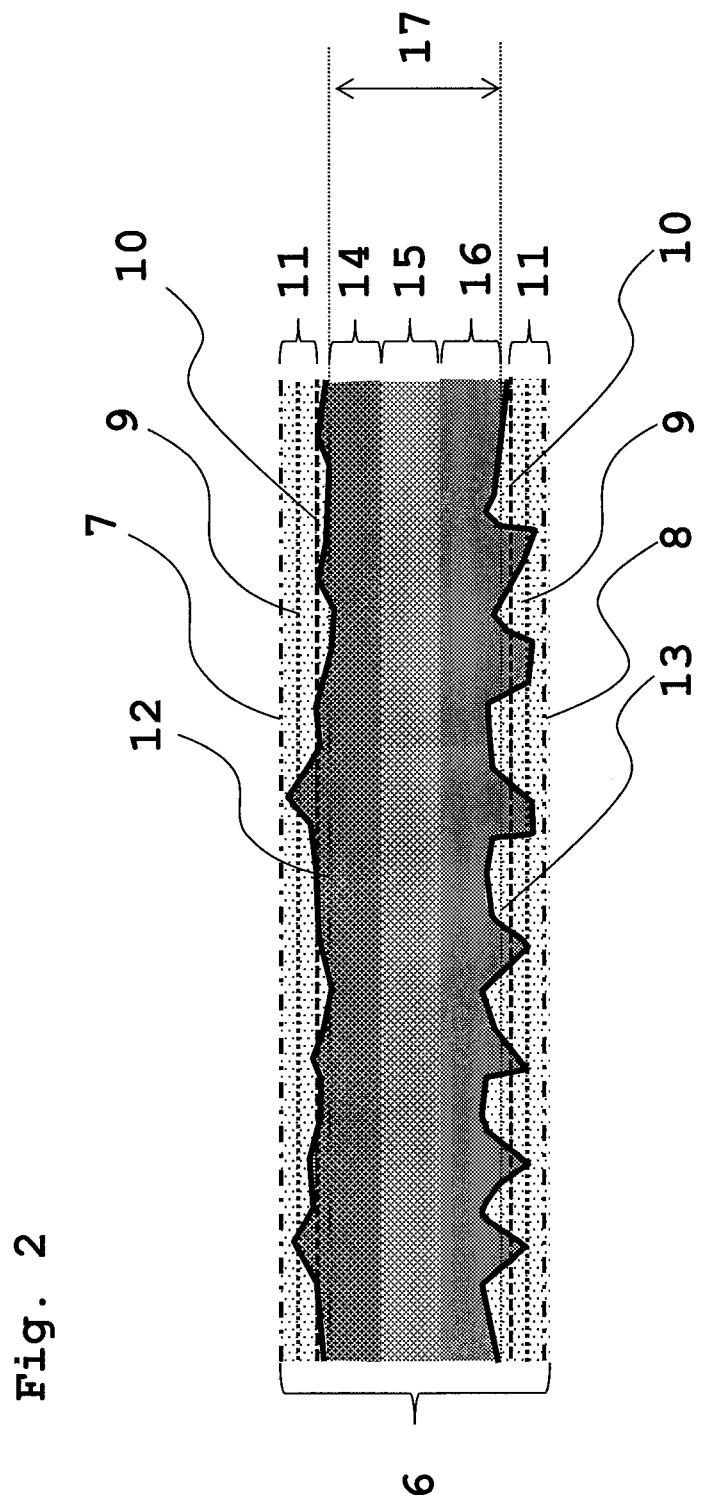
FIG. 2 is a schematic sectional view explaining a configuration of a carbon sheet.

Hereinafter, the configurations of the carbon sheet and the gas diffusion electrode substrate will be described with reference to the drawings. FIG. 2 is a schematic sectional view for explaining a first example and a second example of our carbon sheets, and preferred aspects of the carbon sheets.

In FIG. 2, a depth (reference depth) (9) in a through-plane direction from one surface (surface X1 or surface X2 (7)), at which the cumulative area ratio reaches 2%, is determined by measurement of a surface depth distribution. Using as a reference the depth (reference depth) (9) at which the cumulative area ratio reaches 2%, a depth (10) of a part deeper than the reference depth by 20 μm can be determined. For the opposite surface, a depth (reference depth) (9) at which the cumulative area ratio reaches 2% can be determined, followed by determining a depth (10) of a part deeper than the reference depth by 20 μm.

Next, preferably, where among layers obtained by dividing the carbon sheet in a through-plane direction thereof into three equal parts within a section (17) extending from a surface (surface AA(12)) having a 50% average fluorine intensity, which is closest to one surface (surface X1 or surface X2(7)), to a surface (surface BB(13)) having a 50% average fluorine intensity, which is closest to the other surface (surface Y1 or surface Y2(8)), one of a layer close to one surface (surface X1 or surface X2(7)) and a layer to the other surface (surface Y1 or surface Y2(8)), which has the largest average fluorine intensity, is a layer A(14), and the other one of a layer close to one surface (surface X1 or surface X2(7)) and a layer to the other surface (surface Y1 or surface Y2(8)), which is close to the other surface (surface Y1 or surface Y2(8)) and has an average fluorine intensity smaller than that of the layer A(14), is a layer B(16), and a layer between the layer A(14) and the layer B(16) is a layer C(15), it is preferred that the average fluorine intensity of the layer decrease in the order of the layer A(14), the layer B(16) and the layer C(15).

Thus, the preferred aspect of the carbon sheet (6) includes the layer A(14), the layer B(16), the layer C(15), and the layer (10) having an average fluorine intensity less than the 50% average fluorine intensity. A gas diffusion electrode substrate can be obtained by providing a microporous layer on the surface X1 or the surface X2(7).

A third example of the carbon sheet is a porous carbon sheet including a carbon fiber and a binding material, wherein when the sum of volumes of pores having a pore diameter of 1 to 100 μm is 100%, the sum of volumes of pores having a pore diameter of 50 to 100 μm is 17 to 50%, and the porosity $((\rho t-\rho b)/\rho t)$ calculated from the bulk density ($\rho b$) and the true density ($\rho t$) is 75 to 87%.

Carbon Sheet

The carbon sheet can be prepared through the steps of preparation of a porous material including a carbon fiber as described below, impregnation of a resin composition, lamination and annealing performed as necessary, carbonation, and hydrophobic treatment performed as necessary. The carbon sheet is a porous carbon sheet including a carbon fiber and a binding material, and can be subjected to a hydrophobic treatment as necessary.

The binding material represents components other than the carbon fiber in the carbon sheet. Thus, the binding material includes a carbonized material made from a resin composition that is a material serving to bind carbon fibers. When a hydrophobic material is used in the carbon sheet, the hydrophobic material is included in the binding material.

It is important that the carbon sheet is porous. When the carbon sheet is porous, both excellent gas diffusivity and excellent water removal performance can be achieved. To make the carbon sheet porous, a porous material is preferably used as a material to be used for producing the carbon sheet.

Preparation of Porous Material Including Carbon Fiber

A porous material to be used to produce a porous carbon sheet will be described. Preferably, the porous carbon sheet has high gas diffusivity to allow a gas supplied from a bipolar plate to be diffused into a catalyst and high water removal performance to discharge water generated by an electrochemical reaction to the bipolar plate, as well as high electrical conductivity to extract generated electric current. Thus, to obtain a porous carbon sheet, a porous material having electrical conductivity is preferably used. More specifically, as the porous material to be used to obtain a porous carbon sheet, for example, a porous material including a carbon fiber such as a carbon fiber papermaking substrate, a carbon fiber woven material or a felt-type carbon fiber nonwoven fabric, is preferably used. Among them, a carbon fiber papermaking substrate is preferably used as a porous material because it has excellent property of absorbing a change in dimension of an electrolyte membrane in a through-plane direction when the porous substrate is formed into a porous carbon sheet. Hereinafter, preparation of the porous material will be described with a carbon fiber papermaking substrate as a typical example.

As described below, a substrate on which a carbon fiber papermaking substrate is bonded with a binding material can also be obtained by impregnating a carbon fiber papermaking substrate with a resin and then carbonizing the resultant.

Examples of the carbon fiber in the carbon sheet and the porous material to be used to obtain the carbon sheet include polyacrylonitrile (PAN)-based, pitch-based and rayon-based carbon fibers. Among them, a PAN-based carbon fiber or a pitch-based carbon fiber is preferably used because of its excellent mechanical strength.

In the carbon fiber in the carbon sheet and the porous material to be used to obtain the carbon sheet, the mean diameter of monofilaments is preferably 3 to 20 µm, more preferably 5 to 10 µm. When the mean diameter of monofilaments is 3 µm or more, the pore diameter becomes large, and the water removal performance is improved so that flooding can be suppressed. Meanwhile, when the mean diameter of monofilaments is 20 µm or less, diffusion of water vapor is reduced. Resultantly, when the fuel cell is operated at a relatively high temperature of 80° C. or more, the electrolyte membrane is dried so that proton conductivity is reduced, and resultantly, the problem of deterioration of fuel cell performance (hereinafter, described as "dry-out") can be suppressed.

The mean diameter of monofilaments in the carbon fiber is an average value determined by taking a photograph of the carbon fiber at a magnification of 1000 times, under a microscope such as a scanning electron microscope, randomly selecting 30 different monofilaments, and measuring their diameters. As the scanning electron microscope, S-4800 manufactured by Hitachi, Ltd. or its equivalent product can be used.

In the carbon fiber to be used, the mean length of monofilaments is preferably 3 to 20 mm, more preferably 5 to 15 mm. When the mean length is 3 mm or more, the carbon sheet attains excellent mechanical strength, electrical conductivity and thermal conductivity. Meanwhile, when the mean length of monofilaments is 20 mm or less, dispersibility of the carbon fiber in papermaking is improved so that a uniform carbon sheet can be obtained. A carbon fiber having the above-mentioned mean length of monofilaments can be obtained by a method of cutting a continuous carbon fiber into a desired length or the like.

The mean length of monofilaments in the carbon fiber is an average value determined by taking a photograph of the carbon fiber at a magnification of 50 times, under a microscope such as a scanning electron microscope, randomly selecting 30 different monofilaments, and measuring their length. As the scanning electron microscope, S-4800 manufactured by Hitachi, Ltd. or its equivalent product can be used.

The mean diameter and mean length of monofilaments in the carbon fiber are usually measured by directly observing the carbon fiber for a carbon fiber to be a raw material, and can be measured by observing the carbon sheet.

The carbon fiber papermaking substrate formed by papermaking as one aspect of the porous material to be used to obtain the carbon sheet is preferably in the form of a sheet in which a carbon fiber is randomly dispersed in a two-dimensional plane to maintain the in-plane electrical conductivity and thermal conductivity to be isotropic when the papermaking substrate is formed into the carbon sheet. Papermaking of the carbon fiber in preparation of the carbon fiber papermaking substrate can be performed once or performed multiple times in a laminated form. It is desirable to perform papermaking once to not only improve productivity, but also stably prepare a thin carbon sheet having a thickness that allows high fuel cell performance to be easily achieved.

For the mean diameter of monofilaments in the carbon fiber, the ratio of the mean diameter of monofilaments in the carbon fiber which is determined from one surface of the carbon sheet and the mean diameter of monofilaments in the carbon fiber which is determined from the other surface of the carbon sheet is 0.5 or more and 1 or less. When both the mean diameters are equal to each other, the ratio is 1, and when both the mean diameters are different from each other, the ratio is a value of "smaller mean diameter/larger mean diameter". A difference between the mean length of monofilaments in the carbon fiber which is determined from one surface of the carbon sheet and the mean length of monofilaments in the carbon fiber which is determined from the other surface of the carbon sheet is preferably 0 mm or more and 10 mm or less. Accordingly, uniform dispersion can be performed in dispersion of the fiber, and variations in density and thickness can be reduced at the time of performing papermaking. Thus, in a fuel cell obtained using a gas diffusion electrode substrate including the carbon sheet, adhesion between a catalyst layer and the gas diffusion electrode substrate is improved so that the fuel cell has good fuel cell performance. A fiber composed of monofilaments having a mean diameter of less than 1 µm is considered as a binding material.

The carbon fiber areal weight in the carbon fiber papermaking substrate is preferably 10 to 50 g/m$^2$, more preferably 15 to 35 g/m$^2$, further preferably 20 to 30 g/m$^2$. When the carbon fiber areal weight in the carbon fiber papermaking substrate is 10 g/m$^2$ or more, the carbon sheet obtained from the carbon fiber papermaking substrate has excellent mechanical strength. When the carbon fiber areal weight in the carbon fiber papermaking substrate is 50 g/m$^2$ or less, the carbon sheet obtained from the carbon fiber papermaking substrate has excellent gas diffusivity and water removal performance in an in-plane direction. When a plurality of papermaking substrates are laminated to obtain a carbon fiber papermaking substrate, it is preferred that the carbon fiber areal weight in the carbon fiber papermaking substrate after the lamination be in the above-described range.

The carbon fiber areal weight in the carbon sheet can be determined by retaining a carbon fiber papermaking substrate cut into a 10-cm square under a nitrogen atmosphere in an electric furnace at a temperature of 450° C. for 15 minutes and then dividing the mass of the residue obtained by removal of organic matters by the area of the carbon fiber papermaking substrate (0.01 m$^2$).

Impregnation of Resin Composition

In preparation of the carbon sheet, a porous material containing a carbon fiber such as a carbon fiber papermaking substrate, is impregnated with a resin composition that serves as a binding material.

The binding material in the carbon sheet represents components other than the carbon fiber in the carbon sheet and mainly serves to bind carbon fibers. Examples of the material that serves to bind carbon fibers include resin compositions to be impregnated into the porous material, and carbides thereof. Hereinbelow, a carbon fiber-containing porous material impregnated with a resin composition that serves as a binding material may be described as a "prepreg".

As a method of impregnating a carbon fiber-containing porous material with a resin composition that serves as a binding material, a method of dipping a porous material into a resin composition containing a solvent, a method of coating a porous material with a resin composition containing a solvent, a method of forming on a release film a layer composed of a resin composition, and transferring to a porous material the layer composed of a resin composition, or the like is preferably employed. Among them, a method of dipping a porous material into a resin composition containing solvent is preferably employed because of its excellent productivity. By adhering the resin composition to the whole of a prepreg, the binding material can be adhered to the whole of the resulting carbon sheet and, therefore, the strength of the carbon sheet can be further improved.

The surface layer area ratio or the covering rate for one surface of the carbon sheet may be different from the surface layer area ratio or the covering rate for the other surface of the carbon sheet (details thereof will be described below). This can be achieved by distributing a larger loading amount of the resin composition to one surface at the time of impregnating the porous material with the resin composition that serves as a binding material in the carbon sheet. In other words, this can be achieved by distributing a larger amount of the binding material to one surface in the carbon sheet. More specifically, by uniformly impregnating the whole of a porous material such as a carbon fiber-containing papermaking substrate with a resin composition by dipping or the like, and then removing an excess amount of the adhered resin composition from one surface before drying, one surface and the other surface of the resulting carbon sheet can be controlled to have different surface layer area ratios or covering rates.

As one example, by dipping a carbon fiber papermaking substrate into a resin composition-containing solution to obtain a prepreg, and then suctioning the resin composition-containing solution from one surface or pressing a squeeze roll against only one surface of the carbon fiber papermaking substrate before drying the prepreg, the loading amount of the resin composition in the vicinity of one surface of the carbon fiber papermaking substrate (a surface corresponding to the below-described surface Y1 or Y2 in a carbon sheet formed from the carbon fiber papermaking substrate) can be made smaller than the loading amount of the resin composition in the vicinity of the other surface of the carbon fiber papermaking substrate (a surface corresponding to the below-described surface X1 or X2 in a carbon sheet formed from the carbon fiber papermaking substrate). According to this method, the resin composition can be adhered to the whole of the carbon fiber papermaking substrate and, therefore, the binding material exists on the whole of the resulting carbon sheet, so mechanical strength can be retained.

As another example, by dipping a carbon fiber papermaking substrate into a resin composition-containing solution to obtain a prepreg, and then additionally coating only one surface of the carbon fiber papermaking substrate with the resin composition by a spray or a gravure roll, one surface and the other surface of the carbon sheet can be controlled to have different surface layer area ratios or covering rates. Further, by adhering a larger amount of the resin composition to one surface by gravity applied to the resin composition or by hot-air drying from the surface during drying after dipping the carbon fiber papermaking substrate into the resin composition-containing solution, one surface and the other surface of the carbon sheet can be controlled to have different surface layer area ratios or covering rates.

By dipping two carbon fiber papermaking substrates with the carbon fiber papermaking substrates superimposed on each other such that their surfaces corresponding to the surface Y1 or the surface Y2 are mated with each other, drying the two carbon fiber papermaking substrates with the carbon fiber papermaking substrates superimposed on each other, and drying and then separating the carbon fiber papermaking substrates, the amount of the binding material adhered to the surface Y1 or the surface Y2 can be made smaller than the amount of the binding material adhered to the surface X1 or the surface X2.

Similarly to the carbon sheets of the first and second examples, a carbon sheet of a third example can be prepared by a method of additionally coating only one surface of a carbon fiber papermaking substrate with a resin composition. By impregnating at least one surface of a carbon fiber papermaking substrate with a resin composition containing particles eliminated at a high temperature of 400° C. or more, and eliminating the particles in a carbonization step as described below, the sizes of pores formed in the carbon sheet can be controlled. Only one surface may be impregnated with particles that are eliminated, or the particles can be applied in the form of a pattern to unevenly form portions having large pores.

The resin composition to be used in preparation of a prepreg is a resin component to which a solvent or the like is added as required. The term "resin component" refers to a component which contains a resin such as a thermosetting resin or a thermoplastic resin and, as required, an additive(s) such as a carbon-based powder and a surfactant.

The carbonization yield of the resin component contained in the resin composition is preferably 40% by mass or more. When the carbonization yield is 40% by mass or more, the carbon sheet easily attains excellent mechanical properties, electrical conductivity and thermal conductivity. The carbonization yield of the resin component contained in the resin composition is not particularly limited, and is normally about 60% by mass.

The resin constituting the resin component in the resin composition includes thermosetting resins such as phenolic resins, epoxy resins, melamine resins and furan resins, and the like. Among them, a phenolic resin is preferably used because of its high carbonization yield.

Further, as an additive to be added as a resin component in the resin composition as required, a carbon powder can be used for the purpose of improving the mechanical properties, electrical conductivity and thermal conductivity of the carbon sheet. For the carbon powder, a carbon black such as furnace black, acetylene black, lamp black or thermal black, a graphite such as scaly graphite, scale-like graphite, earthy graphite, artificial graphite, expanded graphite or flaky graphite, a carbon nanotube, a carbon nanofiber, a milled fiber of carbon fiber or the like can be used.

As the resin composition, the resin component can be used as it is, or the resin component may contain various kinds of solvents as required for the purpose of improving impregnation property into a porous material such as a carbon fiber papermaking substrate. As the solvent, methanol, ethanol, isopropyl alcohol or the like can be used.

It is preferred that the resin composition be in a liquid form under a condition of 25° C. and 0.1 MPa. When the resin composition is in a liquid form, it has excellent impregnation property into a porous material such as a papermaking substrate so that the resulting carbon sheet attains excellent mechanical properties, electrical conductivity and thermal conductivity.

In impregnation of the resin composition, the porous material is impregnated with the resin composition such that the amount of the resin component is preferably 30 to 400 parts by mass, more preferably 50 to 300 parts by mass based on 100 parts by mass of the carbon fiber in the prepreg. When the amount of the impregnated resin composition based on 100 parts by mass of the carbon fiber in the prepreg is 30 parts by mass or more, more preferably 50 parts by mass or more, the carbon sheet has excellent mechanical properties, electrical conductivity and thermal conductivity. Meanwhile, when the amount of the impregnated resin composition based on 100 parts by mass of the carbon fiber in the prepreg is 400 parts by mass or less, more preferably 300 parts by mass or less, the carbon sheet has excellent gas diffusivity in an in-plane direction and excellent gas diffusivity in a through-plane direction.

Lamination and Annealing

After a prepreg in which a porous material such as a carbon fiber papermaking substrate is impregnated with a resin composition is formed, the prepreg can be laminated and/or annealed prior to carbonization.

A plurality of prepregs can be laminated to allow the carbon sheet to have a prescribed thickness. In this case, a plurality of prepregs having the same properties can be laminated, or a plurality of prepregs having different properties can be laminated. Specifically, it is possible to laminate a plurality of prepregs that are different in terms of the carbon fiber diameter or carbon fiber length, the areal weight of the carbon fiber in a porous material such as a carbon fiber papermaking substrate to be used in preparation of the prepreg, the amount of the impregnated resin component and the like.

Meanwhile, lamination of a plurality of prepregs causes formation of a discontinuous surface in a through-plane direction so that internal separation may occur and, therefore, it is desirable that rather than laminating a plurality of porous materials such as carbon fiber papermaking substrates, only one porous material be subjected to annealing.

To increase viscosity of the resin composition in the prepreg or partially cross-link the resin composition, the prepreg can be subjected to annealing. As an annealing method, a method of blowing hot air against the prepreg, a method of heating the prepreg by sandwiching it between hot platens of a press apparatus, a method of heating the prepreg by sandwiching it between continuous belts or the like can be employed.

Carbonization

A porous material such as a carbon fiber paper making substrate is impregnated with a resin composition to obtain a prepreg, and the prepreg is then baked in an inert atmosphere for carbonizing the resin component. For this baking, a batch-type heating furnace or a continuous heating furnace can be used. Further, the inert atmosphere can be obtained by allowing an inert gas such as nitrogen gas or argon gas to flow in the furnace.

The highest temperature in the baking is preferably 1300 to 3000° C., more preferably 1700 to 3000° C., and further preferably 1900 to 3000° C. When the highest temperature is 1300° C. or more, carbonization of the resin component in the prepreg is facilitated so that the carbon sheet attains excellent electrical conductivity and thermal conductivity. Meanwhile, when the highest temperature is 3000° C. or less, the operating cost of the heating furnace is reduced.

A porous material such as a carbon fiber papermaking substrate impregnated with a resin composition and then carbonized may be referred to as "baked carbon fiber". The carbon sheet means a baked carbon fiber, and both the baked carbon fiber before being subjected to a hydrophobic treatment and the baked carbon fiber after being subjected to a hydrophobic treatment correspond to the carbon sheet.

Hydrophobic Treatment

It is preferred that the baked carbon fiber be subjected to a hydrophobic treatment for the purpose of improving water removal performance. In other words, it is preferred that the carbon sheet contain a hydrophobic material. The hydrophobic treatment can be performed by coating the baked carbon fiber with a hydrophobic material and subsequently annealing the coated baked carbon fiber. When the hydrophobic treatment is performed using a hydrophobic material, the carbon sheet contains the hydrophobic material as a binding material.

As the hydrophobic material, a fluorine-based polymer is preferably used because of its excellent corrosion resistance. The fluorine-based polymer includes polytetrafluoroethylene (PTFE), tetrafluoroethylene-hexa fluoro propylene copolymers (FEP), tetrafluoroethylene-perfluoroalkylvinyl ether copolymers (PFA), and the like.

In the first or second examples of the carbon sheet, the sliding angle of water at the surface Y1 or the surface Y2 is preferably 40 degrees or less. A gas diffusion electrode substrate can be obtained by forming a microporous layer on the surface X1 or the surface X2 of the carbon sheet. When the gas diffusion electrode substrate is used as a fuel cell, the surface Y1 or the surface Y2 is on the bipolar plate side, and good water removal performance from the carbon sheet to the bipolar plate can be obtained by setting the sliding angle of water at the surface Y1 or the surface Y2 to 40 degrees or less. The sliding angle of water at the surface Y1 or the surface Y2 means a sliding angle determined by making a measurement from the surface Y1 or surface Y2 side of the carbon sheet. The sliding angle at the surface Y1 or the surface Y2 is preferably as small as possible, and the best water removal performance can be achieved at a sliding angle of 1 degree.

As a method of performing control so that the sliding angle of water at the surface Y1 or the surface Y2 is 40 degrees or less, mention may be made of a method of performing a hydrophobic treatment. In annealing in the hydrophobic treatment step, the hydrophobic material is melted, and thus has a low viscosity so that the hydrophobic material can be uniformly adhered to the surface of the carbon fiber in the carbon sheet, and the sliding angle of water can be kept at 40 degrees or less to improve the hydrophobicity of the carbon sheet.

In the third example of the carbon sheet, similarly the sliding angle of water at one surface of the carbon sheet is preferably 40 degrees or less, and this surface is preferably a surface on a side opposite to a surface which is provided with a microporous layer.

Meanwhile, by thinly adhering the hydrophobic material to a surface of the baked carbon sheet, electrical conductivity with the bipolar plate can be improved. It is preferred that the melting point of the hydrophobic material to be used in the hydrophobic treatment be 200° C. or more and 320° C. or less to thinly adhere the hydrophobic material. As a type of the hydrophobic material that satisfies the above-mentioned requirement, mention is made of FEP or PFA. When the melting point of the hydrophobic material is 320° C. or less, the hydrophobic material is easily melted to uniformly spread the hydrophobic over the carbon fiber surface in the carbon sheet in annealing in the hydrophobic treatment so that a carbon sheet having high hydrophobicity can be obtained, and the anti-flooding characteristic can be improved. When the melting point of the hydrophobic material is 200° C. or more, the hydrophobic material is hardly thermally decomposed in annealing in the hydrophobic treatment so that a carbon sheet having high hydrophobicity can be obtained. By using the above-mentioned material, the water removal performance of the carbon sheet having a structure can be considerably enhanced so that accumulation of water in the carbon sheet subjected to the hydrophobic treatment can be reduced and, therefore, gas diffusivity can be considerably improved.

The loading amount of the hydrophobic material is preferably 1 to 50 parts by mass, more preferably 2 to 40 parts by mass based on 100 parts by mass of the baked carbon fiber. When the loading amount of the hydrophobic material is 1 part by mass or more, the carbon sheet has excellent water removal performance. Meanwhile, when the loading amount of the hydrophobic material is 50 parts by mass or less, the carbon sheet has excellent electrical conductivity.

The baked carbon fiber corresponds to the "carbon sheet". As described above, the baked carbon fiber is subjected to a hydrophobic treatment as necessary and the baked carbon fiber subjected to a hydrophobic treatment also corresponds to the "carbon sheet". Of course, the baked carbon fiber that is not subjected to a hydrophobic treatment corresponds to the "carbon sheet".

Features of Carbon Sheet

The features of the carbon sheet obtained through steps as described above will be now be described.

The density of the carbon sheet is preferably 0.20 to 0.40 g/m$^3$, more preferably 0.22 to 0.35 g/m$^3$, further preferably 0.24 to 0.30 g/m$^3$. When the density is 0.20 g/cm$^3$ or more, water vapor diffusivity is small so that dry-out can be suppressed. The mechanical strength of the carbon sheet is improved so that the electrolyte membrane and the catalyst layer can be sufficiently supported. In addition, high electrical conductivity is attained, and the fuel cell performance is thus improved. Meanwhile, when the density is 0.40 g/cm$^3$ or less, water removal performance is improved, and flooding can thus be suppressed.

A carbon sheet having a density as described above can be obtained by controlling the areal weight of the carbon fiber, the addition amount of the resin component based on the amount of the carbon fiber, and the thickness of the carbon sheet as described below in a method of producing a carbon sheet. The density of the carbon sheet can be determined by dividing the areal weight (mass per unit area), which is measured using an electronic balance, by the thickness of the carbon sheet in a state of being compressed at a pressure of 0.15 MPa.

It is not necessarily required to laminate a plurality of prepregs as in the conventional art. Thus, it is easy to reduce the thickness of the carbon sheet.

Also, the thickness of the carbon sheet is preferably 50 to 230 μm, more preferably 70 to 180 μm, further preferably 90 to 130 μm. When the thickness of the carbon sheet is 230 μm or less, more preferably 180 μm or less, further preferably 130 μm or less, gas diffusivity is easily enhanced, and generated water is easily discharged. Further, the size of a fuel cell as a whole is easily reduced. Meanwhile, when the thickness of the carbon sheet is 50 μm or more, more preferably 70 μm or more, further preferably 90 μm or more, gas diffusion in a plane direction in the carbon sheet is efficiently performed, and fuel cell performance is easily improved.

The thickness of the carbon sheet is determined by the following method. Specifically, a carbon sheet and a gas diffusion electrode substrate are placed on a smooth surface plate, and a difference in height between the presence of a measurement object and the absence of the measurement object is measured in a state in which a pressure of 0.15 MPa is applied. Samples are taken at 10 different parts, measured values of the difference in height are averaged, and the average thus obtained is defined as a thickness.

As described above, it is preferred that the surface layer area ratio for one surface be different from the surface layer area ratio for the other surface in the first example of the carbon sheet.

The surface layer area ratio is determined by measuring a surface depth distribution of the carbon sheet using a shape analysis laser microscope. First, 5 mm square of each of randomly selected carbon sheets is fixed on a surface plate such that lifting does not occur, and the surface depth distributions of randomly selected portions are measured using the laser microscope.

The obtained data is subjected to automatic plane tilt correction and a surface depth distribution is then calculated. A profile of a depth versus a ratio of an area (area ratio) of a portion having the depth in measurement of a depth distribution as shown in FIG. 1 is prepared. Area ratios of shallow portions close to the outermost surface are cumulatively added, and the area ratio of a portion at which the cumulative area ratio reaches 2% is defined as an excluded area ratio. Further, using as a reference the depth at which the cumulative area ratio reaches 2%, a cumulative area ratio from the depth as a reference to the depth of a part deeper than the reference by 20 μm is determined. The cumulative area ratio obtained in this manner is a surface layer area ratio. An average of values determined in this manner for 10 points is employed as the surface layer area ratio.

From a physical point of view, the surface layer area ratio represents an area ratio of a substance existing at the surface layer. When a large amount of the carbon fiber or binding material exists at a relatively shallow portion of the surface, the surface layer area ratio is large. The surface layer area ratio can be controlled by adhering a large amount of the binding material in the vicinity of a surface of the carbon sheet by adhering a large amount of the resin composition in the vicinity of a surface of a prepreg in preparation of the prepreg.

For the measurement, a laser microscope (VK-X100 manufactured by KEYENCE CORPORATION) is used, and an objective lens with a magnification of 10 is used. Measurements are made for five lines in a longitudinal direction and for four rows in a lateral direction, and the images of results are linked, whereby surface depth distribution data of 5 mm square can be obtained.

When a fuel cell is operated at a relatively low temperature of below 70° C. in a high-current-density region, as a result of blockage of the gas diffusion electrode substrate by liquid water generated in a large amount and shortage in the gas supply, the fuel cell performance is impaired. This problem is so called flooding, which should be suppressed.

In the first example of the carbon sheet, the surface layer area ratio Y is made smaller than the surface layer area ratio X so that liquid water in the carbon sheet moves from the surface X1 having a large surface layer area ratio to the surface Y1 having a large opening and having a small surface layer area ratio Y, and thus liquid water can be efficiently discharged from the carbon sheet to the bipolar plate. Accordingly, not only water removal performance is improved, but also the inside of the carbon sheet is no longer blocked by water so that gas diffusivity is improved. Thus, flooding can be suppressed even in electrical power generation in a high-current-density region where a large amount of liquid water is generated.

It is desirable that there be a certain difference in surface layer area ratio between both the surfaces of the carbon sheet as described above, and the difference in surface layer area ratio between the surface X1 and the surface Y1 is preferably 3% or more. Meanwhile, when the difference in surface layer area ratio is excessively large, deviation of the binding material distribution excessively increases so that mechanical strength is apt to be insufficient. Thus, the difference in surface layer area ratio is preferably 12% or less. Further, in view of a balance between efficient water removal performance and gas diffusivity, the difference in surface layer area ratio is preferably 4.0% or more and 9.6% or less, more preferably 4.7% or more and 7.0% or less.

For the surface X1, the surface layer area ratio X is preferably 13% or more to control diffusion of water vapor by the surface layer area ratio, and preferably 17% or less to secure diffusion of a fuel gas and an oxidizing gas. Further, in view of a balance with mechanical strength, the surface layer area ratio X is preferably 14.8% or more and 16.0% or less.

For the surface Y1, the surface layer area ratio Y is preferably 9% or more to retain mechanical strength, while the surface layer area ratio is preferably 13% or less to effectively discharge liquid water. In view of a balance with mechanical strength, the surface layer area ratio Y is more preferably 9.1% or more and 10.3% or less.

Where a surface having the surface layer area ratio X is the surface X1, and a surface having the surface layer area ratio Y is the surface Y1, the surface roughness of the surface X1 is preferably smaller than the surface roughness of the surface Y1. When the surface roughness of the surface X1 is smaller than the surface roughness of the surface Y1, penetration of a filler-containing coating solution into the carbon sheet is reduced so that the gas diffusivity of the gas diffusion electrode substrate can be improved. It is desirable that there be a certain difference in surface roughness between the surface X1 and the surface Y1, and the difference in surface roughness is preferably 1 μm or more and 4 μm or less. The surface roughness of the surface X1 means a surface roughness measured from the surface X1 side of the carbon sheet, and the surface roughness of the surface Y1 means a surface roughness measured from the surface Y1 side of the carbon sheet. In the second or third example of the carbon sheet, similarly it is desirable that there be a certain difference in surface roughness between one surface and the other surface, and the difference in surface roughness is preferably 1 μm or more and 4 μm or less.

The surface roughness of the surface X1 is preferably 16 μm or less, more preferably 11 μm or more and 16 μm or less, further preferably 13μ or more and 15 μm or less. Meanwhile, the surface roughness of the surface Y1 is preferably 12 μm or more and 20 μm or less, further preferably 14μ or more and 19 μm or less. When the surface roughness of the surface X1 of the carbon sheet is 16 μm or less, and the surface roughness of the surface Y1 is 12 μm or more and 20 μm or less, penetration of a filler-containing coating solution into the carbon sheet is reduced so that the gas diffusivity of the gas diffusion electrode substrate can be improved. Further, a microporous layer having a small surface roughness can be obtained. In the second or third example of the carbon sheet, similarly the surface roughness of a surface having a smaller surface roughness is preferably 16 μm or less, more preferably 11 μm or more and 16 μm or less, further preferably 13μ or more and 15 μm or less. Meanwhile, the surface roughness of a surface having a larger surface roughness is preferably 12 μm or more and 20 μm or less, further preferably 14μ or more and 19 μm or less.

In the second example of the carbon sheet, it is important that the covering rate on the surface by the carbon fiber and the binding material for one surface of the surface X2 and the surface Y2 is different from the covering rate on the surface by the carbon fiber and the binding material for the other surface.

The covering rate is represented by a ratio of a portion where the surface is covered with the carbon fiber and the binding material in the whole surface (the whole of a void portion and a portion where the carbon fiber and the binding material exist). The covering rate can be determined by performing a numerical treatment of an image of a surface of the carbon sheet observed with a scanning electron microscope. Specifically, the void portion on the surface is separated from the portion where the carbon fiber and the binding material exist on the surface, and the covering rate can be determined from the area ratio of these portions.

First, using a scanning electron microscope (S4800 manufactured by Hitachi, Ltd.), a surface of the carbon sheet is magnified 50 times, a contrast between lightness and darkness is added by an attached automatic adjustment function, and an image of the surface of the carbon sheet is taken. Next, using "J-trim" that is an image processing program, the obtained image is divided in 256 stages between the maximum and the minimum of lightness in terms of a luminance, a portion at the 70th stage from the minimum is defined as a threshold, and binarization is performed. The ratio of the area of a lighter binarized part in the total area is defined as a covering rate [%]. In the second example of the carbon sheet, a surface having a larger covering rate is a surface X2, and a surface having a smaller covering rate is a surface Y2.

In the second example of the carbon sheet, the covering rate on the surface Y2 is made smaller than the covering rate on the surface X2 so that liquid water in the carbon sheet moves from the surface X having a large covering rate to the surface Y2 having a large opening and having a small covering rate, and thus liquid water can be efficiently discharged from the carbon sheet to the bipolar plate. Accordingly, not only water removal performance is improved, but also the inside of the carbon sheet is no longer blocked by water so that gas diffusivity is improved. Thus, flooding can be suppressed even in electrical power generation in a high-current-density region where a large amount of liquid water is generated. To positively make use of a covering rate structure, it is desirable that there be a certain difference in covering rate between both the surfaces of the carbon sheet as described above, and it is important that the difference in covering rate between the surface X2 and the surface Y2 is 5% or more. Meanwhile, when the difference in covering rate is excessively large, deviation of the binding material distribution in the layer excessively increases so that mechanical strength is apt to be insufficient. Thus, it is important that the difference in surface layer area ratio is 20% or less. Further, in view of a balance between efficient water removal performance and gas diffusivity, the difference in surface later area ratio is preferably 6.5% or more and 15.0% or less, more preferably 7.5% or more and 12.0% or less.

For the surface X2, the covering rate on the surface X2 is preferably 70% or more to control diffusion of water vapor by the covering rate, and preferably 90% or less to secure diffusion of a fuel gas and an oxygen gas. Further, in view of a balance between efficient water removal performance and gas diffusivity, the covering rate on the surface X2 is preferably 75.0% or more and 81.4% or less.

For the surface Y2, the covering rate on the surface Y2 is preferably 50% or more to retain strength by binding, while the covering rate on the surface Y2 is preferably 75% or less to effectively discharge liquid water. Further, in view of a balance between efficient water removal performance and gas diffusivity, the covering rate on the surface X2 is preferably 68.0% or more and 75.0% or less.

Preferably, the carbon sheet contains a hydrophobic material, and for the layers A, B and C, the average fluorine intensity of the layer decreases in the order of the layer A, the layer B and the layer C.

Since the average fluorine intensity of the layer C is smaller than the average fluorine intensity of the layer A, generated water produced due to electrical power generation quickly moves from the layer A to the layer C. Since the average fluorine intensity of the layer B is larger than that of the layer C, generated water is hardly accumulated in a portion that is in contact with a bipolar plate rib portion of the layer B so that flooding is suppressed. Generated water flowing through a bipolar plate channel is hardly returned to the carbon sheet. When the layers are arranged in terms of the average fluorine intensity such that the average fluorine intensity decreases in the order of the layer A, the layer B and the layer C, the anti-flooding characteristic can be improved as compared to when the average fluorine intensity decreases in the order of the layer A, the layer C and the layer B.

The average fluorine intensity of the layer to improve the anti-flooding characteristic is preferably such that where the average fluorine intensity of the layer B is 1, the average fluorine intensity of the layer A is 1.30 to 9.00, and the average fluorine intensity of the layer C is 0.10 to 0.90.

Where the average fluorine intensity of the layer B is 1, the average fluorine intensity of the layer C is more preferably 0.30 to 0.80, further preferably 0.50 to 0.70. When the average fluorine intensity of the layer B is 1, the average fluorine intensity of the layer C is 0.90 or less, more preferably 0.80 or less, further preferably 0.70 or less, generated water removal performance is easily remarkably improved, and fuel cell performance is easily improved. When the ratio of the average fluorine intensity of the layer C to the average fluorine intensity of the layer B is 0.10 or more, more preferably 0.30 or more, further preferably 0.50 or more, the layer C has hydrophobicity above a certain level so that generated water is hardly accumulated in the layer C, leading to suppression of flooding.

Where the average fluorine intensity of the layer A is 1, the average fluorine intensity of the layer B is more preferably 1.40 to 8.00, further preferably 1.50 to 7.00. When the ratio of the average fluorine intensity of the layer B to the average fluorine intensity of the layer A is 1.30 or more, more preferably 1.40 or more, further preferably 1.50 or more, generated water is easily discharged from the layer A to the layer B. When the average fluorine intensity of the layer B is 1, the average fluorine intensity of the layer A is 9.00 or less, more preferably 8.00 or less, further preferably 7.00 or less, the layer B has hydrophobicity above a certain level so that generated water is hardly accumulated in a portion that is in contact with a bipolar plate rib portion of the layer B, leading to suppression of flooding.

The carbon sheet in which the average fluorine intensity of the layer decreases in the order of the layer A, the layer B and the layer C is obtained by controlling in a through-plane direction the fiber diameter of the carbon fiber constituting the carbon sheet, the density and the distribution of the binding material, but it is more preferred to control the distribution of the binding material.

The fluorine intensity of the carbon sheet can be measured using a scanning electron microscope (SEM)-energy dispersive X-ray analyzer (EDX). If a carbon sheet subjected to a hydrophobic treatment is not available, the fluorine intensity can be determined using a sample for observation of a thickness-direction cross section of a carbon sheet in a gas diffusion electrode substrate or a carbon sheet in a membrane electrode assembly.

When a fuel cell is operated at a relatively low temperature of below 70° C. in a high-current-density region, as a result of blockage of the gas diffusion electrode substrate by liquid water generated in a large amount and shortage in the gas supply, the fuel cell performance is impaired. This problem is so called flooding, which should be suppressed.

In the first or second example of the carbon sheet, it is preferred that where the sum of volumes of pores having a diameter of 1 to 100 µm is 100%, the sum of volumes of pores having a diameter of 50 to 100 µm be 17 to 50%, and the porosity $((\rho t-\rho b)/\rho t)$ calculated from the bulk density ($\rho b$) and the true density ($\rho t$) be 75 to 87%. In the first or second example of the carbon sheet, the diameter of a pore having the largest volume (peak diameter) in the pore diameter range of 1 to 100 µm is more preferably 30 to 50 µm. The sum of volumes of pores having a diameter of 50 to 100 µm where the sum of volumes of pores having a diameter of 1 to 100 µm is 100% may be hereinafter described as a volume ratio of pores with a diameter of 50 to 100 µm. The preferred range of the volume ratio of pores with a diameter of 50 to 100 µm, the porosity and the peak diameter in the first and second examples of the carbon sheet are the same as the preferred ranges described below in the third example.

A third example of the carbon sheet is a porous carbon sheet including a carbon fiber and a binding material, wherein when the sum of volumes of pores having a pore diameter of 1 to 100 µm is 100%, the sum of volumes of pores having a pore diameter of 50 to 100 µm is 17 to 50%, and the porosity $((\rho t-\rho b)/\rho t)$ calculated from the bulk density ($\rho b$) and the true density ($\rho t$) is 75 to 87%. The volume ratio of pores with a diameter of 50 to 100 µm is preferably 25 to 35%. The porosity $((\rho_t-\rho_b)/\rho_t)$ is preferably 77 to 85%.

Pores having a diameter of 50 to 100 µm have an important role in control of water and water vapor during electrical power generation. The volume ratio of pores with a diameter of 50 to 100 µm is also associated with uniformity of the carbon sheet with respect to formation unevenness or the like. When the volume ratio of pores with a diameter of 50 to 100 µm in the carbon sheet is 17% or more, water removal performance is improved so that flooding can be suppressed. When the volume ratio of pores with a diameter of 50 to 100 µm in the carbon sheet is 50% or less, water vapor diffusivity is small so that dry-out can be suppressed, and a carbon sheet formed by papermaking or the like can be made free from formation unevenness or the like, and uniformly prepared so that mechanical properties such as tensile property can be improved.

Further, when the porosity of the carbon sheet is 75% or more, water removal performance is improved so that flooding can be suppressed. In addition, the carbon sheet can be made flexible, and is therefore easily processed without causing such a failure that the carbon sheet is broken or creased during process passage. A process using a roll having a small diameter can be employed, and space saving and cost reduction of a processing machine are also facilitated. When the porosity of the carbon sheet is 87% or less, dry-out can be suppressed. In addition, since a carbon sheet formed by papermaking or the like can be made free from formation unevenness or the like, and uniformly prepared, mechanical strength such as tensile strength can be improved. Accordingly, sheet breakage does not occur during process passage, and thus stable processing is facilitated.

When the volume ratio of pores with a diameter of 50 to 100 μm in the carbon sheet is 17 to 50%, and the porosity of the carbon sheet is 75 to 87%, flooding and dry-out can be suppressed to improve fuel cell performance at a low temperature and a high temperature and, in addition, stable process passage property can be achieved.

In the third example of the carbon sheet, the diameter of a pore having the largest volume (peak diameter) in the pore diameter range of 1 to 100 μm is preferably 30 to 50 μm, more preferably 35 to 45 μm. When the peak diameter of the carbon sheet is 30 to 50 μm, flooding and dry-out can be more effectively suppressed.

A carbon sheet having a peak diameter of 30 to 50 μm can be obtained by controlling the areal weight and thickness of the carbon sheet, the loading amount of the binding material based on the amount of the carbon fiber, and the covering rate on each of both surfaces of the carbon sheet.

The pore diameter distribution (distribution showing diameters of pores versus volumes of pores) of the carbon sheet is obtained using a mercury penetration method. Three specimens of about 12 mm×20 mm square are cut out from the carbon sheet, precisely weighed, and then put in a measuring cell so as not to overlap one another, and mercury is injected into the cell under reduced pressure. A measurement is made under the conditions shown below.

Measurement pressure range: 6 kPa (pressure at the start of measurement) (pore diameter: 400 μm) to 414 MPa (pressure at the end of measurement) (pore diameter: 30 nm)

Measurement cell mode: pressure raising process in the above pressure range

Cell volume: 5 cm$^3$

Surface tension of mercury: 485 dyn/cm

Contact angle of mercury: 130°

As the measurement apparatus, AutoPore 9520 manufactured by Shimadzu Corporation or its equivalent product can be used. The sum of volumes of pores having a diameter of 1 to 100 μm and the sum of volumes of pores having a diameter of 50 to 100 μm is determined, and the volume ratio of pores with a diameter of 50 to 100 μm is calculated.

The diameter of a pore having the largest volume (peak diameter) in the pore diameter range of 1 to 100 μm is also determined from the pore diameter distribution.

The porosity is calculated from a bulk density $\rho_b$ (g/cm$^3$) and a true density $\rho_t$ (g/cm$^3$) which are measured by the following methods, respectively. The bulk density $\rho_b$ is calculated in accordance with the following equation from a thickness $t_b$ (cm) of a carbon sheet which is determined using a micrometer in a state of being compressed at a pressure of 0.15 MPa, and a mass $M_b$ (g/100 cm$^2$) measured with the carbon sheet cut to a square of 10 cm×10 cm.

$$\rho_b \text{ (g/cm}^3\text{)}=(M_b/t_b)/100$$

Next, the true density $\rho_t$ is calculated in accordance with the following equation from a true volume $V_t$ (cm$^3$) measured by a pycnometer method, and a mass $M_t$ (g) of the sample used in the measurement.

$$\rho_b \text{ (g/cm}^3\text{)}=M_t/V_t$$

As an apparatus for measurement of the true volume $V_t$ (cm$^3$), a pycnometer: MicroUltrapyc 1200e manufactured by Quantachrome Company, or its equivalent product can be used. In the measurement, the sample is filled into a cell such that the ratio of the true volume $V_t$ to the cell volume is 10% or more.

The bulk density $\rho_b$ of the carbon sheet is preferably 0.2 to 0.4 g/m$^3$, more preferably 0.22 to 0.35 g/m$^3$. When the bulk density $\rho_b$ is 0.2 g/cm$^3$ or more, water vapor diffusivity decreases so that dry-out can be suppressed. The mechanical properties of the carbon sheet are improved so that the electrolyte membrane and the catalyst layer can be sufficiently supported. In addition, high electrical conductivity is attained, and fuel cell performance is thus improved at both high and low temperatures. Meanwhile, when the bulk density $\rho_b$ is 0.4 g/cm$^3$ or less, water removal performance is improved so that flooding can be suppressed.

It is also possible to separate the carbon sheet from the gas diffusion electrode substrate, and measure the surface layer area ratio, the covering rate, the volume ratio of pores with a diameter of 50 to 100 μm, the porosity and the peak diameter for the carbon sheet. For example, a gas diffusion electrode substrate is heated in the atmosphere at 600° C. for 30 minutes, a resin composition contained in the microporous layer in the gas diffusion electrode substrate is oxidatively decomposed, then ultrasonic treatment is carried out in a solvent such as ethanol, whereby it is possible to remove the residue of the microporous layer and take out the carbon sheet.

Gas Diffusion Electrode Substrate

The gas diffusion electrode substrate will now be described.

The gas diffusion electrode substrate can be prepared by forming the below-described microporous layer on the carbon sheet.

Formation of Microporous Layer

A microporous layer as one of the constituent elements will now be described.

The carbon sheet can be used as a gas diffusion electrode substrate by forming the microporous layer on one surface of the carbon sheet. When the first or second example of the carbon sheet is used, the gas diffusion electrode substrate has the microporous layer on the surface X1 or the surface X2 of the carbon sheet. When the third example of the carbon sheet is used, the microporous layer may be formed on either surface of the carbon sheet, but in using a carbon sheet prepared by a method in which one surface is made to have pores smaller than the pores of the other surface, it is desirable to form the microporous layer on a surface having smaller pores.

The microporous layer can be formed by performing coating once, but the microporous layer can also be formed by performing coating multiple times. Accordingly, defects on the surface can be considerably reduced so that durability can be improved.

The areal weight of the microporous layer is preferably 10 to 35 g/m$^2$, more preferably 30 g/m$^2$ or less, further preferably 25 g/m$^2$ or less. The areal weight of the microporous layer is preferably 14 g/m$^2$ or more, more preferably 16 g/m$^2$ or more.

When the areal weight of the microporous layer is 10 g/m$^2$ or more, one surface of the carbon sheet can be covered with the microporous layer, and back-diffusion of generated water is further promoted so that dry-out of the electrolyte membrane can be further suppressed. When the areal weight of the microporous layer is 35 g/m$^2$ or less, water removal performance is further improved so that flooding can be further suppressed.

It is preferred that the microporous layer contain a filler. As the filler, a carbon powder is preferred. Examples of the carbon powder include carbon blacks such as furnace black, acetylene black, lamp black and thermal black, graphites such as scaly graphite, scale-like graphite, earthy graphite, artificial graphite, expanded graphite and flaky graphite, carbon nanotubes, carbon nanofibers and milled fibers of carbon fiber. Among them, for the carbon powder, a carbon black is more preferably used, and acetylene black is most preferably used because the content of impurities is low.

A porous material containing linear carbon and a hydrophobic material can also be used in the microporous layer from the viewpoint of improving electrical conductivity and water removal performance.

The microporous layer contains a carbon powder, the carbon powder is that of linear carbon, and the aspect ratio of the linear carbon is 30 to 5000, whereby penetration of a filler-containing coating solution as a precursor of the microporous layer into the carbon sheet can be properly suppressed to improve gas diffusivity and water removal performance in an in-plane direction so that flooding can be suppressed and, further, a microporous layer having a sufficient thickness is formed on a surface of the carbon sheet to back-diffusion of generated water is promoted so that dry-out can be suppressed.

It is preferred that the microporous layer contain water removal material from the viewpoint of promoting removal of water. In particular, a fluorine-based polymer is preferably used as the hydrophobic material because of its excellent corrosion resistance. The fluorine-based polymer includes polytetrafluoroethylene (PTFE), tetrafluoroethylene-hexafluoro propylene copolymers (FEP), tetrafluoroethylene-perfluoroalkylvinyl ether copolymers (PFA) and the like.

The filler-containing coating solution may contain a dispersion medium such as water or an organic solvent, and may contain a dispersant such as a surfactant. The dispersion medium is preferably water, and a nonionic surfactant is preferably used as the dispersant. The filler-containing coating solution may contain a filler such as a variety of carbon powders and a hydrophobic material as described above.

The microporous layer can be formed by coating one surface of the carbon sheet with the filler-containing coating solution containing the filler.

Coating of the carbon sheet with the filler-containing coating solution can be performed using a variety of commercially available coating apparatuses. As a coating system, a coating system such as screen printing, rotary screen printing, spraying, intaglio printing, gravure printing, die coating, bar coating or blade coating can be employed. The coating methods exemplified above are presented for the illustration purpose only, and the coating method is not necessarily restricted thereto.

It is preferred to dry the coating solution at a temperature of 80 to 180° C. after coating the carbon sheet with the filler-containing coating solution. That is, the coated matter is placed in a dryer whose temperature is set at 80 to 180° C. and dried for 5 to 30 minutes. The drying air volume may be appropriately decided, but rapid drying may induce micro cracks in the surface. It is preferred that after the coated matter is dried, the coated matter be placed in a muffle furnace, a baking furnace or a high-temperature drying furnace, and heated at preferably at a temperature of 300 to 380° C. for 5 to 20 minutes to melt the hydrophobic material so that fillers such as carbon powders are bonded together into a binder to form the microporous layer.

Membrane Electrode Assembly

A membrane electrode assembly can be formed by binding the above-described gas diffusion electrode substrate on at least one surface of a solid polymer electrolyte membrane having a catalyst layer on both surfaces. At this time, when the microporous layer of the gas diffusion electrode substrate is arranged on the catalyst layer side, back-diffusion of the generated water is more likely to occur, and also the contact area between the catalyst layer and the gas diffusion electrode substrate is increased so that the contact electrical resistance can be reduced.

Fuel Cell

The fuel cell is a fuel cell including the gas diffusion electrode substrate, i.e. a fuel cell having bipolar plates on both sides of the membrane electrode assembly described above. That is, the fuel cell is constituted by arranging bipolar plates on both sides of the membrane electrode assembly described above. Usually, a polymer electrolyte fuel cell is constituted of laminating a plurality of such membrane electrode assemblies that are sandwiched by bipolar plates from both sides via a gasket. The catalyst layer is composed of a layer containing a solid polymer electrolyte and a carbon material of carbon-supported catalyst. As the catalyst, platinum is usually used. In a fuel cell in which a carbon monoxide-containing reformed gas is supplied to the anode side, it is preferred to use platinum and ruthenium as catalysts of the anode side. As the solid polymer electrolyte, it is preferred to use a perfluorosulfonic acid-based polymer material having high protonic conductivity, oxidation resistance, and heat resistance. The constitutions themselves of the above-mentioned fuel cell unit and fuel cell are well known.

EXAMPLES

The carbon sheet and the gas diffusion electrode substrate will now be described in detail by ways of selected examples. The materials and the methods of producing a carbon sheet and a gas diffusion electrode substrate, and the battery performance evaluation method of fuel cell that are used in the examples are described below.

Preparation of Carbon Sheet

Preparation of 220 μm-Thick Carbon Sheet

Polyacrylonitrile-based carbon fiber "TORAYCA" (registered trademark) T300 (average carbon fiber diameter: 7 μm) manufactured by Toray Industries, Inc. was cut at a mean length of 12 mm and dispersed in water to continuously make a paper by a wet papermaking method. Further, a 10% by mass aqueous solution of polyvinyl alcohol as a binder was coated on the paper and then dried to prepare a papermaking substrate having a carbon fiber areal weight of 44.0 g/m$^2$. The loading amount of the polyvinyl alcohol was 22 parts by mass with respect to 100 parts by mass of the carbon fiber papermaking substrate.

Next, using a resin composition obtained by mixing a resol type phenolic resin and a novolak type phenolic resin at a 1:1 mass ratio as a thermosetting resin, scaly graphite (mean particle size 5 μm) as a carbon powder and methanol as a solvent, the materials were mixed at a ratio of thermosetting resin/carbon powder/solvent=10 parts by mass/5 parts by mass/85 parts by mass, and the resulting mixture was stirred for 1 minute using an ultrasonic dispersion apparatus to obtain a uniformly dispersed resin composition impregnation liquid.

Next, the papermaking substrate was cut into a size of 15 cm×12.5 cm and dipped into the resin composition filled in an aluminum tray, and was then sandwiched between two horizontally arranged rolls, and squeezed. The loading amount of the resin composition based on the amount of the carbon fiber papermaking substrate was adjusted by changing the clearance between the two horizontally arranged rolls. One of the two rolls was a smooth metallic roll having a structure allowing an excess resin to be removed by a doctor blade, and as the other roll, a roll provided with irregularities and called a gravure roll in terms of a configuration was used. The carbon fiber papermaking substrate was sandwiched by the metallic roll on the one surface side and the gravure roll on the other surface side, and the resin composition impregnation liquid was squeezed to provide a difference in loading amount of the resin component between the one surface side and the other surface side of the carbon fiber papermaking substrate. The carbon fiber papermaking substrate was impregnated with the resin composition, and then heated and dried at a temperature of 100° C. for 5 minutes to prepare a prepreg. Next, the prepreg was annealed at a temperature of 180° C. for 5 minutes while being pressed by a pressing machine with flat plates. In pressing of the prepreg, the space between the upper and lower press plates was adjusted by arranging a spacer in the pressing machine with flat plates.

A substrate obtained by annealing the prepreg was introduced into a heating furnace having the highest temperature of 2400° C. in which a nitrogen gas atmosphere was maintained, to obtain a 220 μm-thick carbon sheet composed of a baked carbon fiber.

Preparation of 150 μm-Thick Carbon Sheet

A 150 μm-thick carbon sheet was prepared in accordance with the method described in the above-mentioned method of preparation of the 220 μm-thick carbon sheet, except that the areal weight of the carbon fiber was 30.0 g/m$^2$, and the space between the upper and lower press plates was adjusted in annealing by the pressing machine with flat plates.

Preparation of 100 μm-Thick Carbon Sheet

A 100 μm-thick carbon sheet was prepared in accordance with the method described in the above-mentioned method of preparation of the 220 μm-thick carbon sheet, except that the areal weight of the carbon fiber was 22.0 g/m$^2$, and the space between the upper and lower press plates was adjusted in annealing by the pressing machine with flat plates.

Hydrophobic Treatment

The carbon sheet prepared as described above was dipped into a water dispersion liquid of PTFE resin ("POLYFLON" (registered trademark) PTFE Dispersion D-1E (manufactured by DAIKIN INDUSTRIES, Ltd.)) or a water dispersion liquid of FEP resin ("NEOFLON" (registered trademark) FEP Dispersion ND-110 (manufactured by DAIKIN INDUSTRIES, Ltd.)) as a hydrophobic material to impregnate the baked carbon fiber with the hydrophobic material. Thereafter, the carbon sheet was heated and dried in a drying furnace at a temperature of 100° C. for 5 minutes to prepare a carbon sheet subjected to a hydrophobic treatment. In the drying, the carbon sheet was vertically arranged, and the vertical direction was changed every 1 minute. The water dispersion liquid of the hydrophobic material was diluted to an appropriate concentration to add 5 parts by mass of the hydrophobic material to the 95 parts by mass of the carbon sheet in terms of an amount after drying.

Preparation of Gas Diffusion Electrode Substrate

Materials

Carbon powder A: acetylene black "DENKA BLACK" (registered trademark) manufactured by Denka Company Limited)

Carbon powder B: linear carbon: vapor phase growth carbon fiber "VGCF" (registered trademark) (manufactured by SHOWA DENKO K.K.), aspect ratio: 70

Material C: hydrophobic material: PTFE resin ("POLYFLON" (registered trademark) PTFE Dispersion D-1E (manufactured by DAIKIN INDUSTRIES, Ltd.)) that is a water dispersion liquid containing 60 parts by mass of PTFE resin Material D: surfactant "TRITON" (registered trademark) X-100 (manufactured by Nacalai Tesque)

A filler-containing coating solution was prepared by mixing the above-mentioned materials using a disperser. One surface of the carbon sheet subjected to a hydrophobic treatment was coated with the filler-containing coating solution in a planar form using a slit die coater, and heating was then performed at a temperature of 120° C. for 10 minutes, and then at a temperature of 380° C. for 10 minutes. In this way, a microporous layer was formed on the carbon sheet subjected to a hydrophobic treatment so that a gas diffusion electrode substrate was prepared. The filler-containing coating solutions are filler-containing coating solutions prepared using a carbon powder, a hydrophobic material, a surfactant and purified water and adjusted to have compositions of the filler-containing coating solutions with the addition amounts described in terms of parts by mass as shown in the tables. The addition amounts of the material C (PTFE resin) shown in the tables represent the addition amount of PTFE resin itself rather than the addition amounts of the water dispersion liquid of PTFE resin.

Evaluation of Fuel Cell Performance of Polymer Electrolyte Fuel Cell

A catalyst paste was prepared by sequentially adding 1.00 g of a carbon material of carbon-supported platinum catalyst (manufactured by Tanaka Kikinzoku Kogyo K.K., platinum supporting amount: 50% by mass), 1.00 g of purified water, 8.00 g of "NAFION" (registered trademark) solution (manufactured by Aldrich, "NAFION" (registered trademark), 5.0% by mass) and 18.00 g of isopropyl alcohol (manufactured by Nacalai Tesque).

Then, a "NAFLON" (registered trademark) PTFE tape "TOMBO" (registered trademark) No. 9001 (manufactured by NICHIAS Corporation) which was cut into a size of 5 cm×5 cm was coated with the obtained catalyst paste using a spray and dried at ordinary temperature to prepare a PTFE sheet equipped with a catalyst layer having a platinum amount of 0.3 mg/cm$^2$. Subsequently, a solid polymer electrolyte membrane, "NAFION" (registered trademark) NRE-211CS (manufactured by DuPont) which was cut into a size of 8 cm×8 cm was sandwiched with two catalyst layer-equipped PTFE sheets. The resultant was pressed at a temperature of 130° C. for 5 minutes while pressurizing at 5 MPa using a pressing machine with flat plates, thereby transferring the respective catalyst layers onto the solid polymer electrolyte membrane. After pressing, the PTFE sheets were removed to prepare a catalyst layer-equipped solid polymer electrolyte membrane.

Next, the obtained catalyst layer-equipped solid polymer electrolyte membrane was sandwiched with two gas diffusion electrode substrates cut into a size of 5 cm×5 cm, and the resultant was pressed at a temperature of 130° C. for 5 minutes while pressurizing at 3 MPa using a pressing machine with flat plates, thereby preparing a membrane electrode assembly. The gas diffusion electrode substrate was arranged such that the surface having the microporous layer was in contact with the catalyst layer.

The obtained membrane electrode assembly was incorporated into a fuel cell evaluation unit cell to measure the voltage when the current density was changed. As a bipolar plate, a serpentine-type bipolar plate having one flow channel of 1.0 mm in each of channel width, channel depth and rib width was used. Further, the evaluation was carried out with non-pressurized hydrogen and non-pressurized air being supplied to the anode side and the cathode side, respectively.

To examine the anti-flooding characteristic, hydrogen and air were humidified using a humidification pot whose temperature was set at 40° C. The humidity at this time was 100%. The utilization ratios of hydrogen and atmospheric oxygen were set at 70 mol % and 40 mol %, respectively. The output voltage at a current density of 1.5 A/cm$^2$ was measured, and used as an index of the anti-flooding characteristic. Next, to examine the anti-dry-out characteristic, hydrogen and air were humidified using a humidification pot whose temperature was set at 80° C. The humidity at this time was 42%. The utilization ratios of hydrogen and atmospheric oxygen were set at 80 mol % and 67 mol %, respectively, and the output voltage at a current density of 1.5 A/cm$^2$ was measured, and used as an index of the anti-dry-out characteristic.

Measurement of Areal Weight

The areal weights of the carbon sheet and the gas diffusion electrode substrate were determined by the mass of a sample cut into a 10 cm-square by the area (0.01 m$^2$) of the sample.

Measurement of Thickness

A carbon sheet and a gas diffusion electrode substrate were placed on a smooth surface plate, and a difference in height between the presence of a measurement object and the absence of the measurement object was measured in a state in which a pressure of 0.15 MPa was applied. Samples were taken at 10 different parts, measured values of the difference in height were averaged, and the average thus obtained was defined as a thickness.

Measurement of Mean Diameter in Monofilaments in Carbon Fiber

The mean diameter (carbon fiber diameter) of monofilaments in the carbon fiber is an average value determined by taking a photograph of the carbon fiber on one surface of the carbon sheet at a magnification of 1000 times, under a microscope such as a scanning electron microscope, randomly selecting 30 different monofilaments, and measuring their diameters. The mean diameter of monofilaments in the carbon fiber on the other surface of the carbon sheet is determined in the same manner as described above. As the scanning electron microscope, S-4800 manufactured by Hitachi, Ltd. or its equivalent product can be used. The mean diameters determined from the surface X1 or the surface X2 and the surface Y1 or the surface Y2 are shown in the tables.

The "carbon fiber diameter (surface X1/surface Y1)" in the tables shows the mean diameter of monofilaments in the carbon fiber which is determined from the surface X1 side and the mean diameter of monofilaments in the carbon fiber which is determined from the surface Y1 side.

Measurement of Melting Point of Hydrophobic Material

The melting point of the hydrophobic material was measured by differential scanning calorimetry. Using DSC6220 manufactured by Seiko Instruments Inc. (SII) as the apparatus, the temperature was changed from 30° C. to 400° C. at a heating rate of 2° C./min in nitrogen. The endothermic and exothermic peaks at that time were observed, and the endothermic peak at a temperature of 150° C. or more was defined as the melting point of the hydrophobic material.

Measurement of Surface Roughness

The surface roughness of the carbon sheet was measured using a laser microscope. The measurement was performed by scanning a 5 mm square range with an objective lens with a magnification of 10, using VK-X100 (manufactured by KEYENCE CORPORATION) as a measuring apparatus, and the arithmetic average roughness (Ra) in the 5 mm square was obtained. 10 measurement points were selected, and the average of arithmetic average roughnesses was defined as a surface roughness. The result obtained by making a measurement from the surface X1 side of the carbon sheet was defined as a surface roughness of the surface X1, and the result obtained by making a measurement from the surface Y1 side of the carbon sheet was defined as a surface roughness of the surface Y1.

Measurement of Sliding Angle

The sliding angle of the carbon sheet was determined by a sliding method using an automated contact angle meter. As the apparatus, an automated contact angle meter DM-501 manufactured by Kyowa Interface Science Co., Ltd. was used. The carbon sheet subjected to a hydrophobic treatment was fixed on an apparatus stage with the surface Y set on the upper side (measurement side), 10 μL of a droplet of ion-exchanged water was added to the carbon sheet, the carbon sheet subjected to a hydrophobic treatment was left standing for 1 second, and then inclined together with the apparatus stage, and the inclination angle at the time when the droplet started to slide down along the surface of the carbon sheet subjected to a hydrophobic treatment was defined as a sliding angle.

Measurement of Fluorine Intensity

Figure 3:
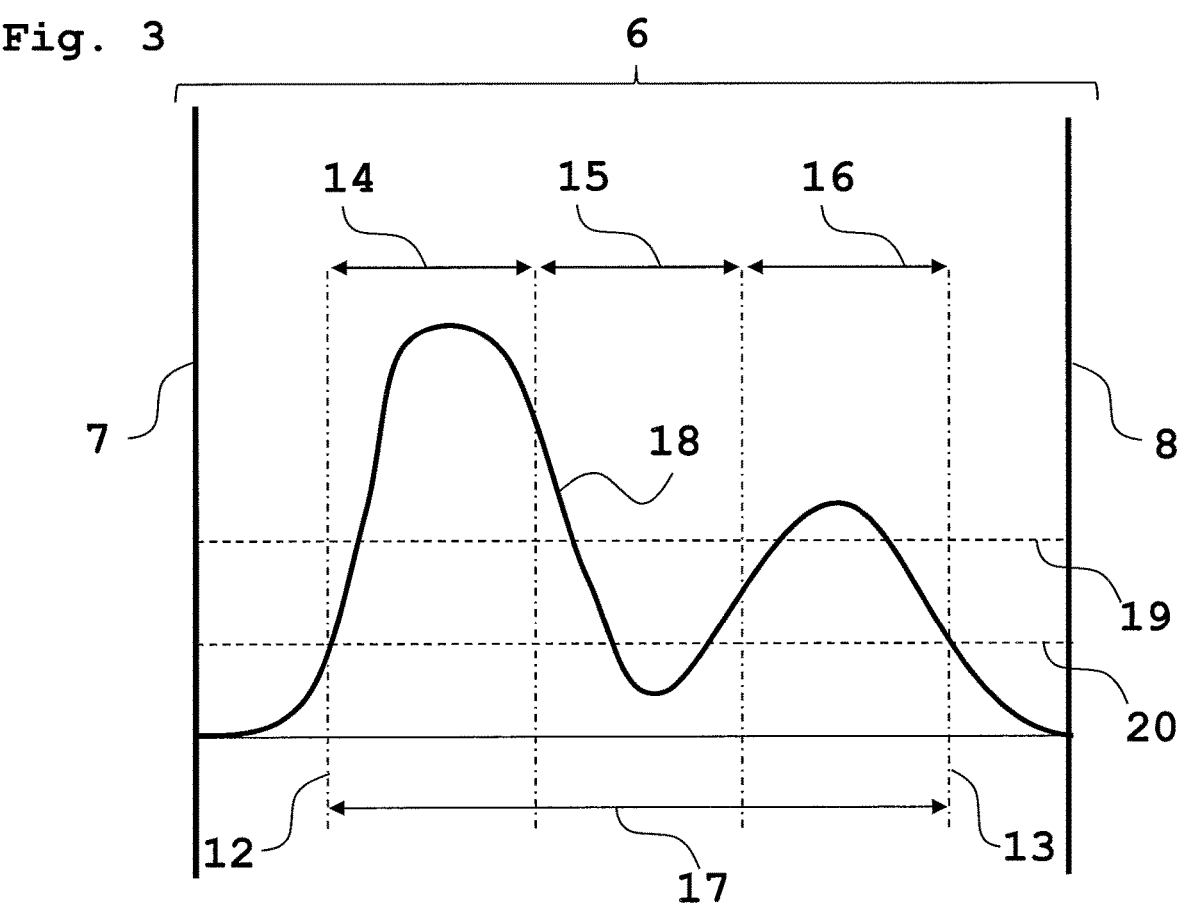
FIG. 3 is a schematic view showing how to determine the fluorine intensity of the carbon sheet.

The fluorine intensity of the carbon sheet was determined in the following manner. This will be described below with reference to FIG. 3. First, one surface and the other surface of a carbon sheet (6) were provisionally defined as a surface X1 or surface X2(7) and a surface Y1 or surface Y2(8), respectively, and randomly 50 samples for observation of a through-plane-direction cross section of the carbon sheet (6) were then prepared using a sharp-edged tool. Using a scanning electron microscope (SEM)-energy dispersive X-ray analyzer (EDX), the cross sections of the 50 samples of the carbon sheet (6) were line-scanned in the through-plane direction of the carbon sheet (6) to determine a distribution (18) of the fluorine intensity (signal intensity of fluorine). The fluorine intensity was measured under the conditions of an acceleration voltage of 7 kV, a magnification of 300 times and a line width of 20 μm. A value (20) of 50% of an average value (19) of fluorine intensities measured along a line in the through-plane direction of the carbon sheet (6), which extended from one surface to the other surface of the carbon sheet (6), was determined, and among layers obtained by dividing the carbon sheet (6) in the through-plane direction into three equal parts within a section (17) extending from a surface (surface AA(12)) having a 50% average fluorine intensity, which was closest to the provisionally defined surface X1 or surface X2(7), to a surface (surface BB(13)) having a 50% average fluorine intensity, which was closest to the provisionally defined surface Y1 or surface Y2(8), a layer including the surface AA(12) was provisionally defined as a layer A(14), a layer including the surface BB(13) was provisionally defined as a layer B(16), and a middle layer sandwiched between the layer A(14) and the layer B(16) was defined as a layer C(15).

The average value of the fluorine intensity in the layer A of each of the 50 carbon sheets was calculated to obtain an "average value of fluorine intensity in layer A" for 50 carbon sheets. The average value of the obtained "average value of fluorine intensity in layer A" for 50 carbon sheets was defined as an average fluorine intensity of the layer A. For the layers B and C, the average fluorine intensity was calculated by the same method as described above. A layer having a larger average fluorine intensity and a layer having a smaller average fluorine intensity were defined as the layer A and the layer B, respectively, of the provisionally defined layers A and B, and a surface on the layer A side of the carbon sheet and a surface on the layer B side of the carbon sheet were defined as the surface X1 or surface X2 and the surface Y1 or surface Y2, respectively.

If the fluorine intensity in the carbon sheet cannot be determined because a single carbon sheet is not available, the fluorine intensity can be determined by the above-mentioned method using a sample for observation of a thickness-direction cross section of a carbon sheet in a gas diffusion electrode substrate or a carbon sheet in a membrane electrode assembly.

Even when the hydrophobic treatment is performed in a discontinuous planar form, for example, in the form of inside portions of a grid or in a dot form, the fluorine intensity can be determined by the above-mentioned method because in this method, the average is taken for randomly prepared 50 samples and, therefore, the fluorine intensity is averaged including that of a discontinuous portion.

As the scanning electron microscope, S-3500N manufactured by Hitachi, Ltd. was used, and as the energy dispersive X-ray analyzer, EX-370 manufactured by HORIBA, Ltd. was used.

Example 1

In accordance with the methods described in "Preparation of Carbon Sheet", "Hydrophobic Treatment" and "Preparation of Gas Diffusion Electrode Substrate", a gas diffusion electrode substrate including a 220 μm-thickness porous carbon sheet having different surface layer area ratios on both sides was obtained. As a result of evaluating the fuel cell performance of this gas diffusion electrode substrate, the output voltage was 0.4 V or more for the anti-flooding characteristic and 0.35 V or more for the anti-dry-out characteristic, and thus both the anti-flooding characteristic and the anti-dry-out characteristic were very good. The results are shown in Table 1.

Example 2

In accordance with the methods described in "Preparation of Carbon Sheet", "Hydrophobic Treatment" and "Preparation of Gas Diffusion Electrode Substrate", a gas diffusion electrode substrate including a 150 μm-thickness porous carbon sheet having different surface layer area ratios on both sides was obtained. As a result of evaluating the fuel cell performance of this gas diffusion electrode substrate, the output voltage was 0.4 V or more for the anti-flooding characteristic and 0.35 V or more for the anti-dry-out characteristic, and thus both the anti-flooding characteristic and the anti-dry-out characteristic were very good. The results are shown in Table 1.

Example 3

In accordance with the methods described in "Preparation of Carbon Sheet", "Hydrophobic Treatment" and "Preparation of Gas Diffusion Electrode Substrate", a gas diffusion electrode substrate including a 100 μm-thickness porous carbon sheet having different surface layer area ratios on both sides was obtained. As a result of evaluating the fuel cell performance of this gas diffusion electrode substrate, the output voltage was 0.4 V or more for the anti-flooding characteristic, and thus the anti-flooding characteristic was very good. For the anti-dry-out characteristic, the output voltage was less than 0.35 V, but a good result was shown with the output voltage being 0.3 V or more. The results are shown in Table 1.

Example 4

In accordance with the methods described in "Preparation of Carbon Sheet", "Hydrophobic Treatment" and "Preparation of Gas Diffusion Electrode Substrate", a gas diffusion electrode substrate including a 150 μm-thickness porous carbon sheet having different surface layer area ratios on both sides was obtained. A doctor blade was attached to a roll which was in contact with the surface Y1 or surface Y2 so that a resin composition adhered to the surface Y1 or surface Y2 was reduced to remove a large amount of a binding material on the surface Y1 or surface Y2, whereby a difference in amount of bonded resin between the surface X1 or surface X2 and surface Y1 or surface Y2 was considerably changed as compared to Example 2. As a result of evaluating the fuel cell performance of this gas diffusion electrode substrate, the output voltage was 0.45 V or more for the anti-flooding characteristic and 0.35 V or more for the anti-dry-out characteristic, and thus both the anti-flooding characteristic and the anti-dry-out characteristic were very good. As described above, the anti-flooding characteristic and the anti-dry-out characteristic were considerably improved, and this may be because there was a large difference in surface layer area ratio, leading to improvement of water removal performance. The results are shown in Table 1.

Example 5

In accordance with the methods described in "Preparation of Carbon Sheet", "Hydrophobic Treatment" and "Preparation of Gas Diffusion Electrode Substrate", a gas diffusion electrode substrate including a 150 μm-thickness porous carbon sheet having different surface layer area ratios on both sides as shown in Table 1 was obtained. The clearance between two rolls for sandwiching the carbon sheet was made larger as compared to Example 2 so that the amount of the binding material was larger on both the surface X and the surface Y as compared to Example 2. The output voltage was 0.4 V or more for the anti-flooding characteristic and 0.35 V or more for the anti-dry-out characteristic, and thus both the anti-flooding characteristic and the anti-dry-out characteristic were very good. The results are shown in Table 1.

Example 6

In accordance with the methods described in "Preparation of Carbon Sheet", "Hydrophobic Treatment" and "Preparation of Gas Diffusion Electrode Substrate", a gas diffusion electrode substrate was prepared in the same manner as in Example 4 except that the amount of the resin composition was made larger as compared to Example 4. A 150 μm-thickness porous carbon sheet having different surface layer area ratios on both sides was obtained, and further a gas diffusion electrode substrate was obtained. The anti-flooding characteristic was good with the output voltage being 0.35 V or more. The anti-dry-out characteristic was very good with the output voltage being 0.35 V or more. The results are shown in Table 1.

Example 7

In accordance with the methods described in "Preparation of Carbon Sheet", "Hydrophobic Treatment" and "Preparation of Gas Diffusion Electrode Substrate", a gas diffusion electrode substrate was prepared in the same manner as in Example 2 except that the hydrophobic material used for the hydrophobic treatment of the carbon sheet was changed to a tetrafluoroethylene-hexafluoropropylene copolymer (FEP). As a result, a 150 μm-thickness porous carbon sheet having different surface layer area ratios on both sides was obtained, and further a gas diffusion electrode substrate was obtained. The output voltage was 0.45 V or more for the anti-flooding characteristic and 0.35 V or more for the anti-dry-out characteristic, and thus both the anti-flooding characteristic and the anti-dry-out characteristic were very good. The carbon sheet was made uniformly hydrophobic by a hydrophobic treatment using FEP having a low melting point, and the sliding angle was 25 degrees, a value much smaller than 40 degrees. Thus, it was confirmed that hydrophobicity was considerably improved. Therefore, it was confirmed that the anti-flooding characteristic was considerably improved owing to a synergistic effect in improvement of water removal performance due to a difference in surface layer area ratio between both sides and improvement of hydrophobicity. The results are shown in Table 1.

Example 8

A carbon sheet and a gas diffusion electrode substrate were obtained in the same manner as in Example 2 except that in the configuration shown in Table 2, the composition of a filler-containing coating solution for forming a microporous layer was different from that in Example 2. As a result of evaluating the fuel cell performance of this gas diffusion electrode substrate, the output voltage was much larger than 0.4 V or more for the anti-flooding characteristic and 0.35 V or more for the anti-dry-out characteristic, and thus both the anti-flooding characteristic and the anti-dry-out characteristic were very good. This may be because due to use of a filler having a high aspect ratio in the microporous layer, the microporous layer has a high porosity, leading to gas diffusivity. Therefore, it was confirmed that the anti-flooding characteristic was considerably improved owing to a synergistic effect of improvement of gas diffusivity due to enhancement of the porosity of the microporous layer and improvement of water removal performance. The results are shown in Table 2.

Example 9

A long fiber of polyacrylonitrile was subjected to a flameproofing treatment at a temperature of 200° C. for 10 minutes, a nonwoven fabric was prepared by a water flow entanglement treatment, and roll pressing was performed. The long fiber was introduced into a heating furnace at a temperature of 2000° C. to obtain a carbon sheet composed of a baked carbon fiber of a 150 μm-thick nonwoven fabric. As a binding material also serving as a hydrophobic material, an impregnation liquid was prepared by dispersing the carbon powder A as a solid and the material C, i.e. PTFE resin, in water together with a dispersant such that the solid mass ratio of the carbon powder A and the material C was 1:1. The nonwoven fabric subjected to a flameproofing treatment was dipped into the impregnation liquid, and then sandwiched between two horizontally arranged rolls (one of the two rolls is a smooth metallic roll having a doctor blade, and the other roll is a gravure roll provided with irregularities) with a certain clearance provided therebetween, and was squeezed to impregnate the nonwoven fabric with the impregnation liquid so that loading amounts on both sides were adjusted. Thereafter, heating was performed in a heating furnace at 380° C. for 10 minutes. As a result, a hydrophobic-treated carbon sheet bonded by 5% by mass, in terms of a solid amount, of a binding material also serving as a hydrophobic material was obtained. In accordance with the method described in "Preparation of Gas Diffusion Electrode Substrate", a gas diffusion electrode substrate was prepared in the same manner as in Example 2. A gas diffusion electrode substrate including a 150 μm-thickness porous carbon sheet having different surface layer area ratios on both sides as shown in Table 2 was obtained. The output voltage was 0.4 V or more for the anti-flooding characteristic and 0.35 V or more for the anti-dry-out characteristic, and thus both the anti-flooding characteristic and the anti-dry-out characteristic were very good. The results are shown in Table 2.

Comparative Example 1

In the methods described in "Preparation of Carbon Sheet", "Hydrophobic Treatment" and "Preparation of Gas Diffusion Electrode Substrate", a carbon fiber papermaking substrate impregnated with a resin composition was sandwiched between two rolls of the same shape from both surfaces to squeeze a liquid so that a binding material was adhered to the carbon fiber papermaking substrate to perform a hydrophobic treatment. Otherwise in the same manner as in Example 2, a gas diffusion electrode substrate was prepared. As a result, the amounts of the binding material adhered to both surfaces were similar to each other and, therefore, the difference in surface layer area ratio between both surfaces was 5% or less as shown in Table 2. A gas diffusion electrode substrate included a 150 μm-thickness porous carbon sheet. The output voltage was smaller than 0.35 V for the anti-flooding characteristic and much smaller than 0.3 V for the anti-dry-out characteristic, and thus both the anti-flooding characteristic and the anti-dry-out characteristic were insufficient. The results are shown in Table 2.

Comparative Example 2

In the methods described in "Preparation of Carbon Sheet", "Hydrophobic Treatment" and "Preparation of Gas Diffusion Electrode Substrate", a gas diffusion electrode substrate was prepared in the same manner as in Example 2 except that a resin composition was adhered to one surface by gravure coating in impregnation of the carbon fiber papermaking substrate with the resin composition. As a result, the difference in surface layer area ratio between both surfaces was 13% or more as shown in Table 2. A gas diffusion electrode substrate included a 150 μm-thickness porous carbon sheet. The output voltage was smaller than 0.35 V for the anti-flooding characteristic and much smaller than 0.3 V for the anti-dry-out characteristic, and thus both the anti-flooding characteristic and the anti-dry-out characteristic were insufficient. The results are shown in Table 2.

Comparative Example 3

In "Preparation of Carbon Sheet", the same carbon fiber papermaking substrate as in Example 3 was impregnated with a resin composition by the same method as in Comparative Example 1 to prepare a prepreg. Meanwhile, a carbon fiber papermaking substrate was obtained by the same method as in Example 3 except that a carbon fiber having a mean diameter of 3 μm and a mean length of 2 mm was used, and the carbon fiber papermaking substrate was impregnated with a resin composition by the same method as in Comparative Example 1 to prepare a prepreg. These two prepregs were superimposed on each other, and heated and pressed to be laminated. Otherwise by the same method as in Example 3, a 250 μm-thickness porous carbon sheet was obtained, and further a gas diffusion electrode substrate was obtained. As a result of evaluating the fuel cell performance of this gas diffusion electrode substrate, the output voltage was much smaller than 0.35 V for the anti-flooding characteristic and much smaller than 0.3 V for the anti-dry-out characteristic, and thus both the anti-flooding characteristic and the anti-dry-out characteristic were insufficient. This is because a lamination system was employed and, therefore, the carbon sheet was thickened, leading to insufficient gas diffusivity and water removal performance. The results are shown in Table 2.

An attempt was made to prepare a gas diffusion electrode substrate using a thinner carbon sheet, but it was unable to stably prepare a gas diffusion electrode substrate due to insufficient strength of the carbon sheet.

TABLE 1

| | | Example 1 | Example 2 | Example 3 | Example 4 | Example 5 | Example 6 | Example 7 |
|---|---|---|---|---|---|---|---|---|
| Carbon sheet | Thickness [μm] | 220 | 150 | 100 | 150 | 150 | 150 | 150 |
| | Areal weight [g/m$^2$] | 69 | 45 | 35 | 46 | 48 | 51 | 46 |
| | Mean diameter of carbon fiber (surface X1 side) [μm] | 7.1 | 7.1 | 7.1 | 7.1 | 7.2 | 7.1 | 7.1 |
| | Mean diameter of carbon fiber (surface Y1 side) [μm] | 7.0 | 7.2 | 7.1 | 7.0 | 7.0 | 7.3 | 7.3 |
| | Resin used for hydrophobic treatment | PTFE | PTFE | PTFE | PTFE | PTFE | PTFE | FEP |
| | Surface layer area ratio X [%] | 16.9 | 15.0 | 14.9 | 15.2 | 19.8 | 22.7 | 14.9 |
| | Surface layer area ratio Y [%] | 8.9 | 10.4 | 10.4 | 9.2 | 16.0 | 10.9 | 9.8 |
| | Difference in surface layer area ratio (surface X1 − surface Y1) [%] | 8.0 | 4.6 | 4.5 | 6.0 | 3.8 | 11.8 | 5.1 |
| | Surface roughness (surface X1) [μm] | 14.0 | 15.1 | 14.2 | 14.8 | 13.8 | 12.8 | 14.9 |
| | Surface roughness (surface Y1) [μm] | 18.3 | 17.8 | 17.6 | 18.6 | 14.0 | 17.4 | 17.9 |
| | Difference in surface roughness (surface Y1 − surface X1) [μm] | 4.3 | 2.7 | 3.4 | 3.8 | 0.2 | 4.6 | 3.0 |
| | Covering rate on surface X2 side [%] | 81.2 | 78.2 | 78.0 | 78.5 | 85.9 | 90.5 | 78.0 |
| | Covering rate on surface Y2 side [%] | 68.5 | 70.9 | 70.9 | 68.9 | 79.8 | 71.6 | 69.9 |
| | Difference in covering rate (surface X2 − surface Y2) [%] | 12.8 | 7.3 | 7.2 | 9.6 | 6.1 | 18.9 | 8.1 |
| | Volume ratio of pores with diameter of 50 to 100 μm [%] | 38 | 34 | 31 | 37 | 27 | 25 | 34 |
| | Porosity [%] | 81 | 80 | 76 | 79 | 81 | 81 | 82 |
| | Peak diameter [μm] | 43 | 41 | 39 | 43 | 39 | 36 | 40 |
| | Ratio of fluorine intensity (layer A/layer B) | 1.45 | 1.45 | 1.45 | 2.03 | 7.50 | 8.50 | 1.45 |
| | Ratio of fluorine intensity (layer C/layer B) | 0.40 | 0.40 | 0.40 | 0.60 | 0.75 | 0.85 | 0.40 |
| | Sliding angle (surface Y1 or surface Y2) [degree] | 65 | 64 | 67 | 63 | 64 | 65 | 25 |
| | Melting point of hydrophobic material (DSC method) [degree] | 331 | 329 | 330 | 331 | 330 | 329 | 309 |
| Composition of filler-containing coating solution for microporous layer | Carbon powder A [parts by mass] | 7.0 | 7.0 | 7.0 | 7.0 | 7.0 | 7.0 | 7.0 |
| | Carbon powder B [parts by mass] | — | — | — | — | — | — | — |
| | Material C [parts by mass] | 2.5 | 2.5 | 2.5 | 2.5 | 2.5 | 2.5 | 2.5 |
| | Material D [parts by mass] | 14 | 14 | 14 | 14 | 14 | 14 | 14 |
| | Purified water [parts by mass] | 74.8 | 74.8 | 74.8 | 74.8 | 74.8 | 74.8 | 74.8 |
| Gas diffusion electrode substrate | Areal weight [g/m$^2$] | 83 | 59 | 49 | 60 | 63 | 65 | 60 |
| | Thickness [μm] | 240 | 171 | 121 | 169 | 170 | 169 | 170 |
| Anti-flooding characteristic | Output voltage [V] | 0.40 | 0.43 | 0.44 | 0.45 | 0.41 | 0.35 | 0.46 |
| Anti-dry-out characteristic | Output voltage [V] | 0.36 | 0.35 | 0.34 | 0.35 | 0.36 | 0.36 | 0.35 |

TABLE 2

| | | Example 8 | Example 9 | Comparative Example 1 | Comparative Example 2 | Comparative Example 3 |
|---|---|---|---|---|---|---|
| Carbon sheet | Thickness [μm] | 150 | 150 | 150 | 150 | 250 |
| | Areal weight [g/m$^2$] | 46 | 46 | 47 | 47 | 80 |
| | Mean diameter of carbon fiber (surface X1 side) [μm] | 7.2 | 7.2 | 7.1 | 7.0 | 3.1 |
| | Mean diameter of carbon fiber (surface Y1 side) [μm] | 7.1 | 7.1 | 7.1 | 7.2 | 7.2 |
| | Resin used for hydrophobic treatment | PTFE | PTFE | PTFE | PTFE | PTFE |
| | Surface layer area at X [%] | 15.0 | 15.0 | 12.6 | 21.8 | 31.0 |
| | Surface layer area at Y [%] | 10.2 | 10.4 | 12.4 | 8.1 | 9.7 |
| | Difference in surface layer area ratio (surface X1 − surface Y1) [%] | 4.8 | 4.6 | 0.2 | 13.7 | 21.3 |
| | Surface roughness (surface X1) [μm] | 14.8 | 15.2 | 16.2 | 12.8 | 11.0 |
| | Surface roughness (surface Y1) [μm] | 17.1 | 17.7 | 16.3 | 19.2 | 17.8 |
| | Difference in surface roughness (surface Y1 − surface X1) [μm] | 2.3 | 2.5 | 0.1 | 6.4 | 6.8 |
| | Covering rate on surface X2 side [%] | 78.2 | 78.2 | 74.4 | 89.1 | 92.0 |
| | Covering rate on surface Y2 side [%] | 70.5 | 70.9 | 74.0 | 67.2 | 69.7 |

TABLE 2-continued

| | | Example 8 | Example 9 | Comparative Example 1 | Comparative Example 2 | Comparative Example 3 |
|---|---|---|---|---|---|---|
| | Difference in covering rate (surface X2 − surface Y2) [%] | 7.7 | 7.3 | 0.3 | 21.9 | 22.3 |
| | Volume ratio of pores with diameter of 50 to 100 μm [%] | 34 | 27 | 15 | 52 | 25 |
| | Porosity [%] | 80 | 81 | 81 | 80 | 73 |
| | Peak diameter [μm] | 41 | 34 | 40 | 47 | 38 |
| | Ratio of fluorine intensity (layer A/layer B) | 1.45 | 1.45 | 1.00 | 2.60 | 9.50 |
| | Ratio of fluorine intensity (layer C/layer B) | 0.40 | 0.85 | 0.66 | 1.40 | 0.39 |
| | Sliding angle (surface Y1 or surface Y2) [degree] | 64 | 65 | 63 | 68 | 66 |
| | Melting point of hydrophobic material (DSC method) [degree] | 329 | 331 | 328 | 330 | 328 |
| Composition of filler-containing coating solution for microporous layer | Carbon powder A [parts by mass] | 3.5 | 7.0 | 7.0 | 7.0 | 7.0 |
| | Carbon powder B [parts by mass] | 3.5 | — | — | — | — |
| | Material C [parts by mass] | 2.5 | 2.5 | 2.5 | 2.5 | 2.5 |
| | Material D [parts by mass] | 14 | 14 | 14 | 14 | 14 |
| | Purified water [parts by mass] | 74.8 | 74.8 | 74.8 | 74.8 | 74.8 |
| Gas diffusion electrode substrate | Areal weight [g/m²] | 60 | 60 | 61 | 61 | 85 |
| | Thickness [μm] | 172 | 170 | 171 | 169 | 270 |
| Anti-flooding characteristic | Output voltage [V] | 0.46 | 0.42 | 0.31 | 0.33 | 0.25 |
| Anti-dry-out characteristic | Output voltage [V] | 0.37 | 0.35 | 0.23 | 0.22 | 0.27 |

The invention claimed is:

1. A gas diffusion electrode substrate comprising a microporous layer and a porous carbon sheet comprising a carbon fiber and a carbonized binding material, wherein
the carbon sheet has a surface X1 having a surface layer area ratio X and an opposite surface Y1 having a surface layer area ratio Y, in which the surface layer area ratio X is defined as a ratio of an area of a portion of the carbon fiber and the carbonized binding material on surface X1 having a depth of 20 μm or less and the surface layer area ratio Y is defined as a ratio of an area of a portion of the carbon fiber and the carbonized binding material on the surface Y1 having a depth of 20 μm or less; wherein the depths are measured from a reference point of an excluded area ratio as determined by laser microscope,
the surface layer area ratio X is larger than the surface layer area ratio Y, a difference between the surface layer area ratios is 3% or more and 12% or less, and the microporous layer is disposed on the surface X1 or a surface X2 of the carbon sheet.

2. The substrate according to claim 1, wherein the surface layer area ratio X is 13% or more and 17% or less, and the surface layer area ratio Y is 9% or more and 13% or less.

3. The substrate according to claim 1, wherein a surface roughness of the surface X1 is smaller than a surface roughness of the surface Y1, and a difference between the surface roughnesses of the surfaces X1 and Y1 is 1 μm or more and 4 μm or less.

4. The substrate according to claim 1, wherein surface roughness of the surface X1 is 16 μm or less.

5. The substrate according to claim 1, wherein the carbon sheet includes a hydrophobic material, and where among layers obtained by dividing the carbon sheet in a through-plane direction thereof into three equal parts within a section extending from a surface having a 50% average fluorine intensity, which is closest to one surface, to a surface having a 50% average fluorine intensity, which is closest to another surface, one of a layer close to one surface and a layer close to the other layer, which has a larger average fluorine intensity, is a layer A, the other one of a layer close to one surface and a layer close to the other layer, which has a smaller average fluorine intensity, is a layer B, and a layer between the layer A and the layer B is a layer C, the average fluorine intensity of the layer decreases in the order of the layer A, the layer B and the layer C.

6. The substrate according to claim 5, wherein the melting point of the hydrophobic material is 200° C. or more and 320° C. or less.

7. The substrate according to claim 3, wherein the sliding angle of water at the surface Y1 is 40 degrees or less.

8. The substrate according to claim 1, wherein when a sum of volumes of pores having a pore diameter of 1 to 100 μm is 100%, a sum of volumes of pores having a pore diameter of 50 to 100 μm is 17 to 50%, and
porosity (($\rho t - \rho b$)/$\rho t$) calculated from bulk density ($\rho b$) and true density ($\rho t$) is 75 to 87%.

9. The substrate according to claim 8, wherein the diameter of a pore having the largest volume (peak diameter) in the diameter range of 1 to 100 μm is 30 to 50 μm.

10. A fuel cell comprising the gas diffusion electrode substrate according to claim 1.

* * * * *